United States Patent
Song et al.

(10) Patent No.: US 8,159,430 B2
(45) Date of Patent: *Apr. 17, 2012

(54) LIQUID CRYSTAL DISPLAY AND DRIVING METHOD THEREOF

(75) Inventors: Jang-Kun Song, Seoul (KR); Yun Jang, Cheonan (KR); Eun-Hee Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 796 days.

This patent is subject to a terminal disclaimer.

(21) Appl. No.: 12/043,792

(22) Filed: Mar. 6, 2008

(65) Prior Publication Data

US 2008/0165298 A1    Jul. 10, 2008

Related U.S. Application Data

(63) Continuation of application No. 10/449,309, filed on May 29, 2003, now Pat. No. 7,355,666.

(30) Foreign Application Priority Data

Jul. 19, 2002 (KR) .............................. 2002-0042657

(51) Int. Cl.
  *G09G 3/36* (2006.01)
  *G02F 1/1343* (2006.01)
(52) U.S. Cl. ............. 345/87; 349/144; 349/38; 349/139
(58) Field of Classification Search ............ 345/87–104; 349/38, 139, 144
See application file for complete search history.

(56) References Cited

U.S. PATENT DOCUMENTS

| | | | |
|---|---|---|---|
| 4,822,142 A | 4/1989 | Yasui | |
| 5,132,820 A | 7/1992 | Someya et al. | |
| 5,253,091 A | 10/1993 | Kimura et al. | |
| 5,357,290 A | 10/1994 | Horibe | |
| 5,495,353 A | 2/1996 | Yamazaki et al. | |
| 5,808,706 A | 9/1998 | Bae | |
| 5,936,686 A | 8/1999 | Okumura et al. | |
| 6,067,063 A | 5/2000 | Kim et al. | |
| 6,175,351 B1 | 1/2001 | Matsuura et al. | |
| 6,335,778 B1 | 1/2002 | Kubota et al. | |
| 6,683,592 B1 | 1/2004 | Murade | |

(Continued)

FOREIGN PATENT DOCUMENTS

CN      1285526      2/2001

(Continued)

OTHER PUBLICATIONS

European Search Report dated Jan. 18, 2010 in corresponding European Appln. No. 03012183.4.

*Primary Examiner* — Srilakshmi K Kumar
(74) *Attorney, Agent, or Firm* — F. Chau & Associates, LLC

(57) ABSTRACT

A liquid crystal display are provided, which includes: a liquid crystal panel assembly including a plurality of pixels arranged in a matrix including a plurality of rows and a plurality of columns, a plurality of gate lines, and a plurality of data lines, wherein the number of the data lines is larger than the number of the columns, the data lines are separated from each other in the panel assembly, each pixel is connected to one of the gate lines and adjacent to two of the data lines, and the pixels in each column are alternately connected to the adjacent data lines at least every one row.

13 Claims, 29 Drawing Sheets

U.S. PATENT DOCUMENTS

| | | |
|---|---|---|
| 6,914,644 B2 | 7/2005 | Fukami et al. |
| 2002/0080313 A1 | 6/2002 | Lim |

FOREIGN PATENT DOCUMENTS

| | | |
|---|---|---|
| EP | 0287055 | 10/1988 |
| EP | 0376329 | 7/1990 |
| EP | 0466378 | 1/1992 |
| EP | 0632646 | 1/1995 |
| EP | 0660592 | 6/1995 |
| JP | 02-214894 | 8/1990 |
| JP | 03-024635 | 3/1991 |
| JP | 04-067091 | 3/1992 |
| JP | 05-100209 | 4/1993 |
| JP | 09-265112 | 10/1997 |
| JP | 11-337911 | 12/1999 |
| JP | 2001-042287 | 2/2001 |
| KR | 1020010021366 | 3/2001 |
| WO | 9948080 | 9/1999 |

LIQUID CRYSTAL DISPLAY AND DRIVING METHOD THEREOF

CROSS-REFERENCE TO RELATED APPLICATIONS

This application is a Continuation of U.S. patent application Ser. No. 10/449,309 filed May 29, 2003 now U.S. Pat. No. 7,355,666, which claims priority to Korean Application No. 2002-42657 filed Jul. 19, 2002, the disclosures of which are incorporated by reference herein in their entirety

BACKGROUND OF THE INVENTION (a) Field of the Invention

The present invention relates to a liquid crystal display and a driving method thereof.

(b) Description of the Related Art

Liquid crystal displays (LCDs) are the most commonly used one of flat panel displays (FPDs) handy to carry.

An LCD includes a pair of panels having field-generating electrodes and polarizers, and a liquid crystal (LC) layer with dielectric anisotropy, which is interposed between the panels and subject to electric field generated by the electrodes. The variation of the field strength changes molecular orientations of the LC layer, which tend to align parallel or perpendicular to the field direction. The LCD passes light through the LC layer via the polarizers and reorients the LC molecules to change the polarization of the light. The polarizers convert the change of the polarization into the change of the light transmittance and enable to obtain desired images.

The LCD has a narrow viewing angle. In particular, a twisted-nematic (TN) mode LCD having nematic LC with twisted alignment is widely used due to its many advantages, its application to monitors and television sets is limited due to its narrow viewing angle.

Several techniques such as multi-domains and compensation films for widening the viewing angle of the LCD are developed. In particular, compensation films often called wide viewing films give viewing characteristics in a lateral direction as good as other wide viewing techniques. However, gray inversion (that the brightness decreases as the gray voltage increases in a normally black mode LCD or vice versa in a normally white mode LCD) in a vertical direction still remains, which is severe particularly when viewing from the bottom.

Furthermore, a multi-domain LCD shows poor visibility at a lateral view compared with a normal TN mode LCD due to the inconsistency of gamma curves for a lateral view and for a front view. For example, a patterned-vertically-aligned (PVA) mode LCD having cutouts for forming domains displays brighter and whiter images as it goes away from the front to the lateral side. Sometimes, the brightness of the higher grays becomes indistinguishable to make the image mashed.

SUMMARY OF THE INVENTION

A liquid crystal display according to an aspect of the present invention includes: a plurality of pixels arranged in a column; a plurality of gate lines; and first and second data lines adjacent to the pixels, wherein each pixel is connected to one of the gate lines, the pixels are alternately connected to the first and the second data lines at least every one row, and the first and the second data lines provide data signals having polarity reversed at least every one row such that the pixels receive the data voltages having the same polarity.

A liquid crystal display according to an aspect of the present invention includes: a liquid crystal panel assembly including a plurality of pixels arranged in a matrix including a plurality of rows and a plurality of columns, a plurality of gate lines, and a plurality of data lines, wherein the number of the data lines is larger than the number of the columns, the data lines are separated from each other in the panel assembly, each pixel is connected to one of the gate lines and adjacent to two of the data lines, and the pixels in each column are alternately connected to the adjacent data lines at least every one row.

Each pixel includes two subpixels, and each subpixel includes a switching element. Two of the pixels adjacent to each other in a column are capacitively coupled.

Preferably, at least two of the data lines, particularly a first data line and a last data line are supplied with the same data signals.

The liquid crystal display further includes a plurality of data driving ICs having a plurality of output terminals connected to the data lines and including a first driving IC having a first output terminal electrically connected to the first data line and the last data line.

The liquid crystal display further includes a printed circuit board including a circuit element for driving the data driving ICs; and first and second flexible printed circuit films connecting the panel assembly and the printed circuit board, mounting the data driving ICs, and including a first signal line connected to the first output terminal of the first driving IC and a second signal line connected to the first data line, respectively, wherein the printed circuit board includes a third signal line connected between the first signal line and the second signal line.

The liquid crystal display further includes a signal controller for providing image signals and a control signal for controlling the image signals for the data driving ICs, the signal generator last supplying the image signals for the pixels in a first column connected to the first data line and first supplying the image signals for the pixels in the first column connected to a second data line.

According to an embodiment of the present invention, a method of driving a liquid crystal display including a plurality of pixels arranged in a matrix including a plurality of rows and a plurality of columns, a plurality of gate lines, and a plurality of data lines, each pixel connected to one of the gate lines and adjacent to two of the data lines, the pixels in each column alternately connected to the adjacent data lines at least every one row is provided which includes: receiving a plurality of image signals for the pixel in a row; storing a first image signal among the received image signals; sequentially outputting the image signals from a second image signal; and outputting the stored first image signal.

The method further includes: converting the image signals into data signals; and supplying the data signals for the data lines, the data signals to be applied to adjacent two pixels in a row having opposite polarities and the data signals to be applied to adjacent two pixels in a column having the same polarity.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
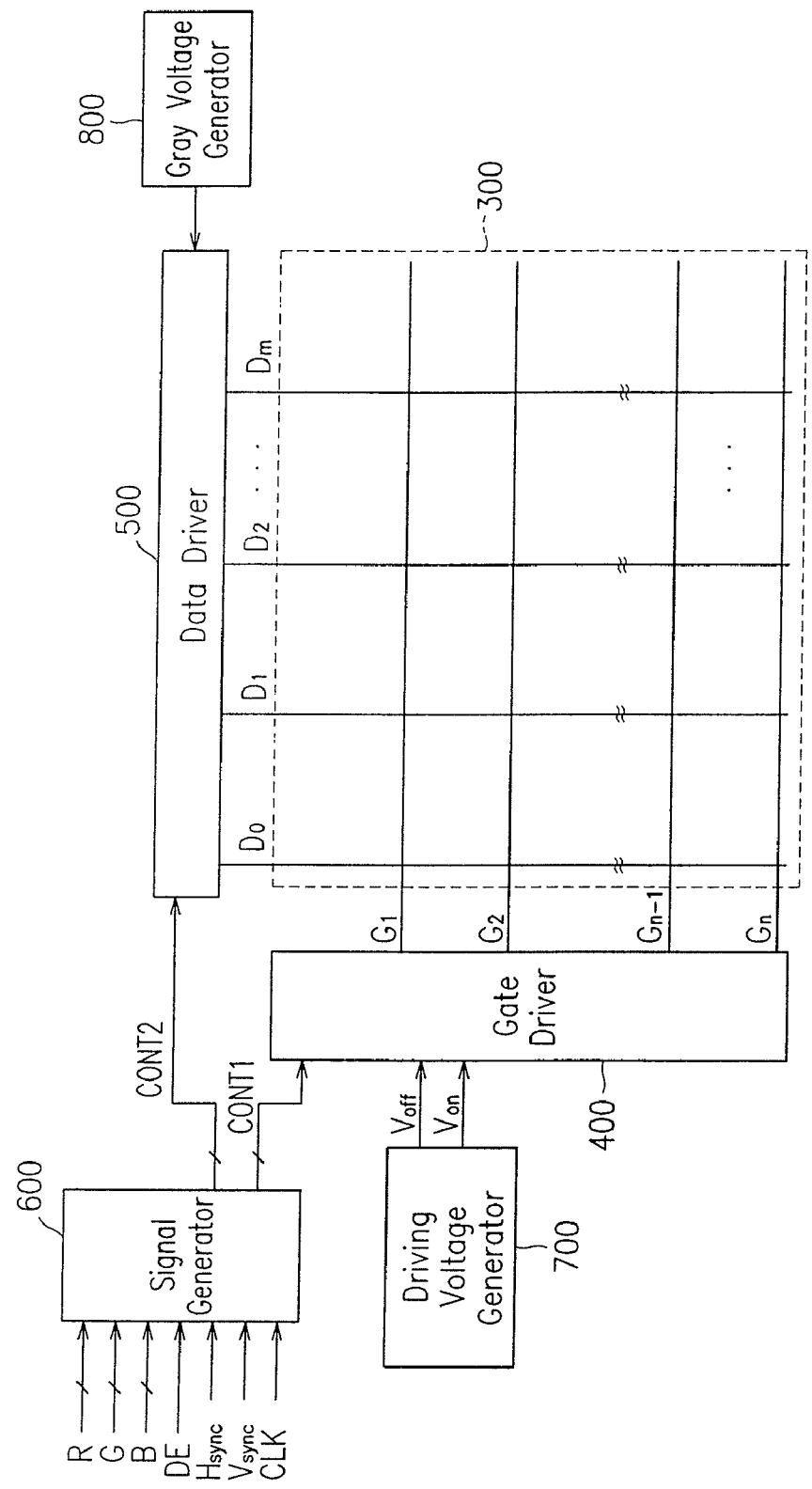
FIG. 1 is a block diagram of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, liquid crystal displays and driving methods thereof according to embodiments of the present invention will be described with reference to the drawings.

Figure 2:
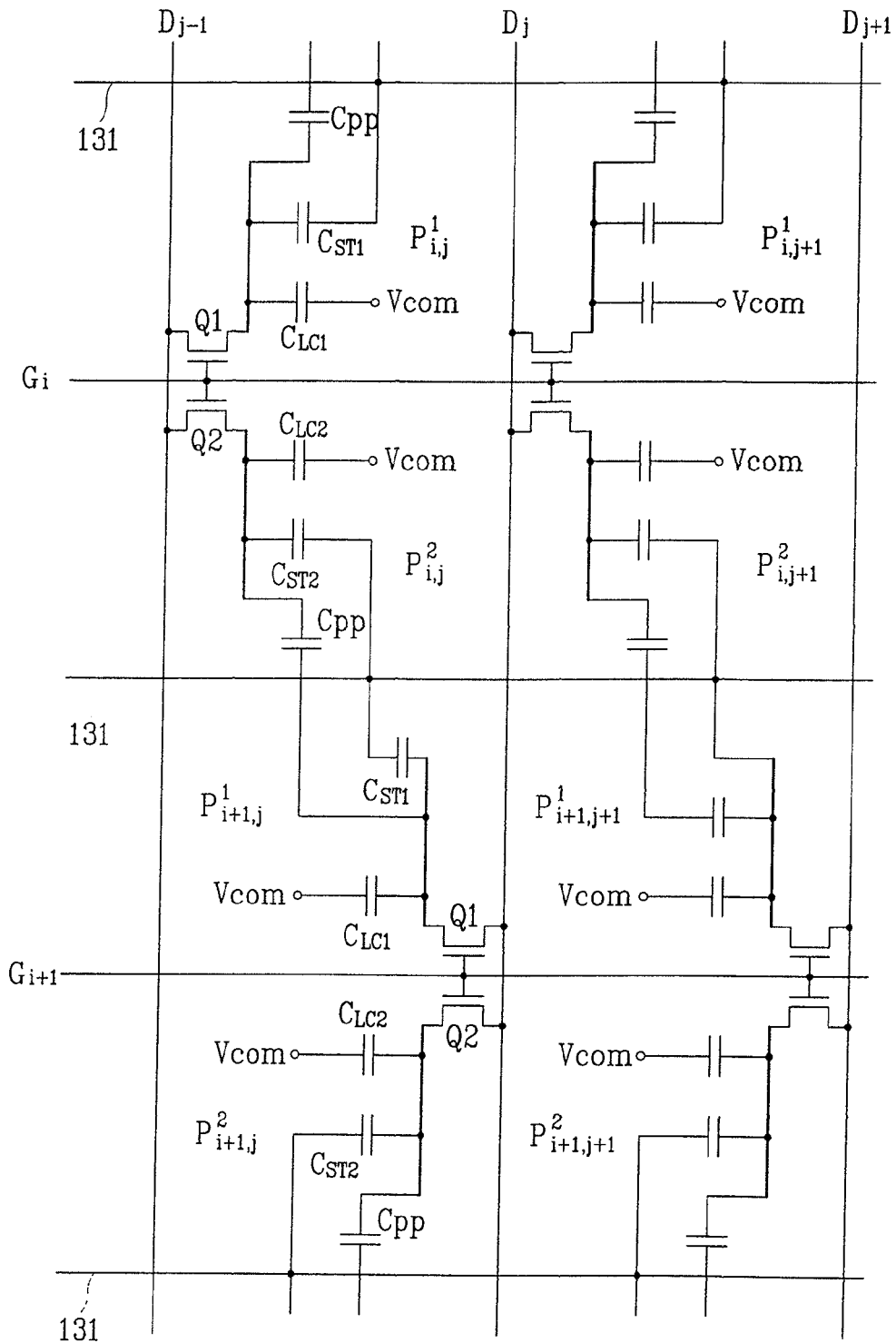
FIG. 2 is an equivalent circuit diagram of a pixel of an LCD according to an embodiment of the present invention.
Figure 3:
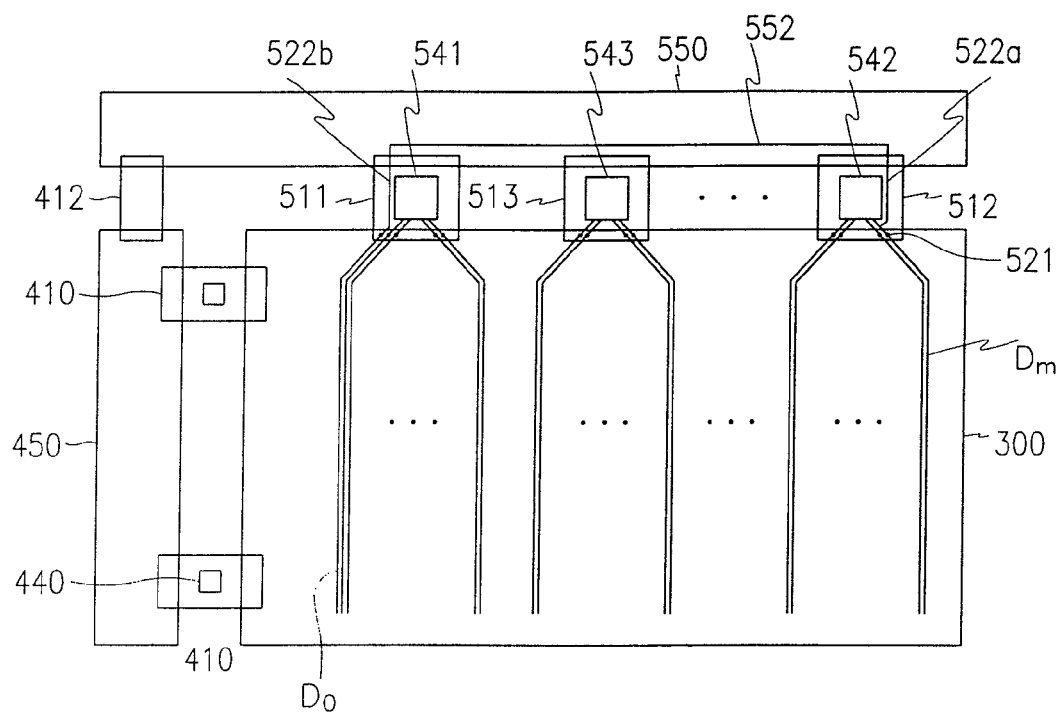
FIG. 3 is a schematic diagram of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention. FIG. 3 is a schematic diagram of an LCD according to an embodiment of the present invention.

Referring to FIG. 1, an LCD according to an embodiment includes an LC panel assembly 300, a gate driver 400 and a data driver 500 which are connected to the panel assembly 300, a driving voltage generator 560 connected to the gate driver 400, a gray voltage generator 800 connected to the data driver 500, and a signal controller 600 controlling the above elements.

The panel assembly 300 includes a plurality of display signal lines $G_1$-$G_n$, $D_0$-$D_m$ and 131 and a plurality of pixels connected thereto and arranged substantially in a matrix.

The display signal lines $G_1$-$G_n$ and $D_0$-$D_m$ include a plurality of gate lines $G_1$-$G_n$ transmitting gate signals (called scanning signals) and a plurality of data lines $D_0$-$D_m$ transmitting data signals. The gate lines $G_1$-$G_n$ extend substantially in a row direction and are substantially parallel to each other, and the data lines $D_0$-$D_m$ extend substantially in a column direction and are substantially parallel to each other.

The display signal lines 131 further includes a plurality of storage electrode lines 131 located between the gate lines $G_1$-$G_n$ and between the pixels and supplied with a common voltage Vcom.

Referring to FIG. 2, each pixel $P_{ij}$ (i=1, 2, . . . , n and j=1, 2, . . . , m) includes a pair of subpixels $P_{i,j}^1$ and $P_{i,j}^2$, and each subpixel $P_{i,j}^1$ or $P_{i,j}^2$ includes a switching element Q1 or Q2 connected to a pair of one of the gate lines $G_1$-$G_n$ and one of the data lines $D_0$-$D_m$, and an LC capacitor $C_{LC1}$ or $C_{LC2}$ and a storage capacitor $C_{ST1}$ or $C_{ST2}$ that are connected to the switching element Q1 or Q2.

Two adjacent pixels in the column direction are capacitively coupled by a coupling capacitor Cpp. For example, an upper subpixel $P_{i,j}^1$ of a pixel $P_{ij}$ is capacitively coupled with a lower subpixel $P_{i,j}^2$ of an upper pixel $P_{i-1,j}$, and a lower subpixel $P_{i,j}^2$ of a pixel $P_{ij}$ is capacitively coupled with an upper subpixel $P_{i+1,j}^1$ of a lower pixel $P_{i+1,j}$.

The pixels in one pixel column are alternately connected to two data lines located on both hands of the pixel column. For example, a pixel $P_{ij}$ in the j-th column is connected to the (−1)-th data line $D_{j-1}$, while a next pixel $P_{i+1,j}$ is connected to the j-th data line $D_j$. On the contrary, the pixels in one pixel row are connected to the data lines on the same hand. For example, all pixels in the i-th row is connected to the left data lines, while all pixels in the (i+1)-th are connected to the right data lines.

Such a connection between the pixels and the data lines $D_0$-$D_1$ requires the data lines $D_0$-$D_1$ more than the pixel columns by one.

According to another embodiment of the present invention, all pixels in one pixel column are connected to the same data line. In this case, the number of the data lines $D_0$-$D_1$ is equal to the number of the pixel columns.

The switching element Q1 or Q2 has three terminals: a control terminal connected to one of the gate lines $G_1$-$G_n$; an input terminal connected to one of the data lines $D_0$-$D_m$; and an output terminal connected to the LC capacitor $C_{LC1}$ or $C_{LC2}$, the storage capacitor $C_{ST1}$ or $C_{ST2}$, and the coupling capacitor Cpp.

The LC capacitor $C_{LC1}$ or $C_{LC2}$ is connected between the switching element Q1 or Q2 and a common voltage Vcom. The storage capacitor $C_{ST1}$ or $C_{ST2}$ is connected between the switching element Q1 or Q2 and the storage electrode line 131.

This pixel structure that a pixel includes two switching elements and two LC capacitors and adjacent pixels are capacitively coupled by a coupling capacitor prevents gray inversion at a bottom view and improves visibility at all directions.

Referring to FIG. 1 again, the driving voltage generator 700 generates a gate-on voltage $V_{on}$ for turning on the switching elements Q1 and Q2 and a gate-off voltage $V_{off}$ for turning off the switching elements Q1 and Q2.

The gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 often called a scanning driver is connected to the gate lines $G_1$-$G_n$ of the panel assembly 300 and applies gate signals to the gate lines $G_1$-$G_n$, each gate signal being a combination of the gate-on voltage $V_{on}$ and the gate off voltage $V_{off}$ from the driving voltage generator 700.

The data driver 500 often called a source driver is connected to the data lines $D_0$-$D_m$ of the panel assembly 300 and applies data voltages selected from the gray voltages from the gray voltage generator 800 to the data lines $D_0$-$D_m$.

The signal controller 600 controls the gate driver 400, the data driver 500, and the driving voltage generator 560.

Referring to FIG. 3, the signal generator 600, the driving voltage generator 700, and the gray voltage generator 800 are provided on printed circuit boards (PCBs) 450 and 550, and the gate driver 400 and the data driver 500 include a plurality of gate driving integrated circuits ("ICs") 440 and a plurality of data driving ICs 541-543, respectively.

In detail, a gate PCB 450 is located at the left of the panel assembly 300 and connected to the panel assembly 300 via a plurality of gate flexible printed circuit films (FPC) 410. A data PCB 550 are located at the top of the panel assembly 300 and connected to the panel assembly 300 via a plurality of data FPC films 511-513. A gate driving IC 440 is mounted on each gate FPC film 410, while a data driving IC 541-543 is mounted on each data FPC film 511-513. An additional FPC film 412 is attached to the gate PCB 450 and the data PCB 550. The FPC film 412 includes a plurality of signal lines (not shown) for electrical connection between the gate PCB 450 and the data PCB 550.

A plurality of signal lines 521 connecting the output terminals of the data driving ICs 541-543 to the data lines $D_0$-$D_m$ of the panel assembly 300 are formed on the data FPC films 511-513. The last terminal of the rightmost data driving IC 542 connected to the rightmost data line $D_m$ is electrically connected to the leftmost data line called a dummy data line $D_0$ via a signal line 522a formed on the rightmost FPC film 512 mounting the rightmost driving IC 542, a signal line 522 formed on the data PCB 550, and a signal line 522b formed on the leftmost FPC film 511 mounting the leftmost data driving IC 541. An amplifier (not shown) such as an operational amplifier for compensating the voltage drop between the last terminal of the rightmost data driving IC 542 and the dummy data line $D_0$ due to the resistance of the signal line 522 may be provided at an end point or an intermediate point of the signal line 522 of the data PCB 550.

Unlike FIG. 3, the gate driver 400 and the data driver 500 may be mounted on the panel assembly 300, or may be formed on the panel assembly 300 by means of a process for forming the display signal lines $G_1$-$G_m$, $D_0$-$D_m$ and 131. The gray voltage generator 800 may be partially provided in both the data PCB 550 and the data driving ICs 541-543.

If all pixels in one pixel column are connected to the same data line according to another embodiment of the present invention, the dummy data line $D_0$ and the signal lines 522, 522a and 522b are omitted.

Now, the operation of the LCD will be described in detail.

The signal controller 600 is supplied with RGB image signals R, G and B and input control signals controlling the display thereof such as a vertical synchronization signal $V_{sync}$, a horizontal synchronization signal $H_{sync}$, a main clock CLK, and a data enable signal DE, from an external graphic controller (not shown). After generating gate control signals CONT1 and data control signals CONT2 on the basis of the input control signals and processing the image signals R, G and B suitable for the operation of the panel assembly 300, the signal controller 600 provides the gate control signals CONT1 for the gate driver 400, and the processed image signals R', G' and B' and the data control signals CONT2 for the data driver 500.

The gate control signals CONT1 include a vertical synchronization start signal STV for informing of start of a frame, a gate clock signal CPV for controlling the output time of the gate-on voltage $V_{on}$, and an output enable signal OE for defining the width of the gate-on voltage $V_{on}$. The data control signals CONT2 include a horizontal synchronization start signal STH for informing of start of a horizontal period, a load signal LOAD or TP for instructing to apply the appropriate data voltages to the data lines $D_0$-$D_m$, an inversion control signal RVS for reversing the polarity of the data voltages (with respect to the common voltage Vcom) and a data clock signal HCLK.

The data driver 500 receives a packet of the image data R', G' and B' for a pixel row from the signal controller 600 and converts the image data R', G' and B' into the analogue data voltages selected from the gray voltages supplied from the gray voltage generator 800 in response to the data control signals CONT2 from the signal controller 600.

Responsive to the gate control signals CONT1 from the signals controller 600, the gate driver 400 applies the gate-on voltage $V_{on}$ to the gate line $G_1$-$G_n$, thereby turning on the switching elements Q1 and Q2 connected thereto.

The data driver 500 applies the data voltages to the corresponding data lines $D_0$-$D_m$ for a turn-on time of the switching elements Q1 and Q2 due to the application of the gate line $G_1$-$G_n$ connected thereto (which is called "one horizontal period" or "1H" and equals to one periods of the horizontal synchronization signal $H_{sync}$, the data enable signal DE, and the gate clock signal CPV). Then, the data voltages in turn are supplied to the corresponding pixels via the turned-on switching elements Q1 and Q2.

The difference between the data voltage and the common voltage Vcom applied to a pixel is expressed as a charged voltage of the LC capacitor $C_{LC1}$ or $C_{LC2}$, i.e., a pixel voltage. The liquid crystal molecules have orientations depending on the magnitude of the pixel voltage and the orientations determine the polarization of light passing through the LC capacitor $C_{LC1}$ or $C_{LC2}$. Polarizers (indicated by reference numerals 11 and 21 in FIG. 11A) convert the light polarization into the light transmittance.

By repeating this procedure, all gate lines $G_1$-$G_n$ are sequentially supplied with the gate-on voltage $V_{on}$ n during a frame, thereby applying the data voltages to all pixels. When the next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed (which is called "line inversion"), or the polarity of the data voltages in one packet are reversed (which is called "dot inversion").

Next, a method of applying data voltages to an LC panel assembly according to an embodiment of the present invention will be described in detail with reference to FIGS. 4-6.

Figure 4:
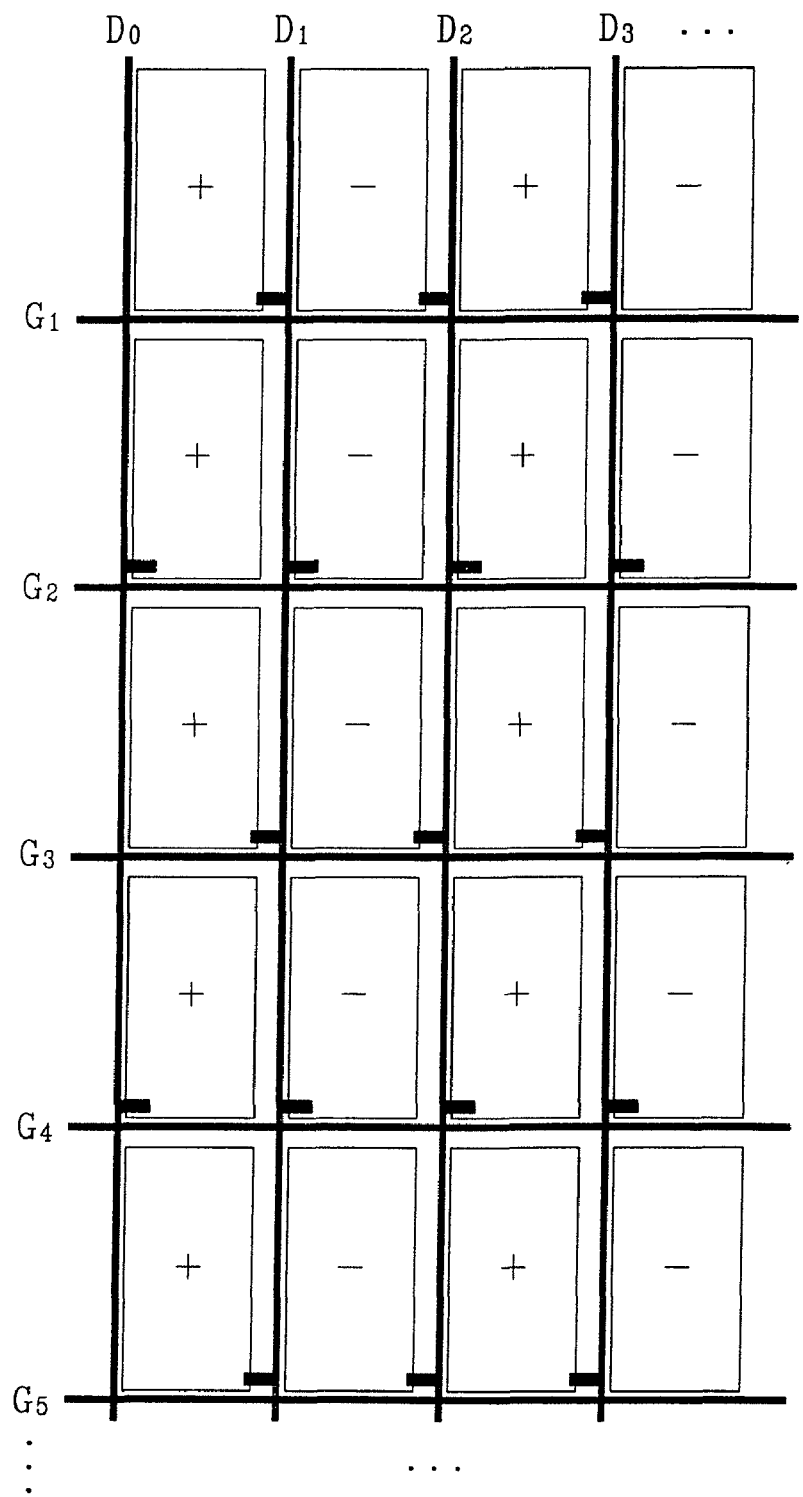
FIG. 4 shows the connections between pixels and data lines of an LC panel assembly according to an embodiment of the present invention.
Figure 5:
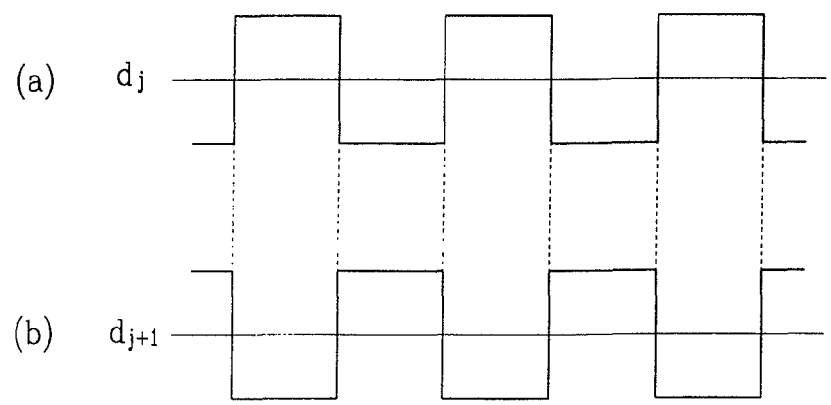
FIG. 5 is a diagram showing waveforms of data signals applied to adjacent data lines of an LC panel assembly according to an embodiment of the present invention.
Figure 6:
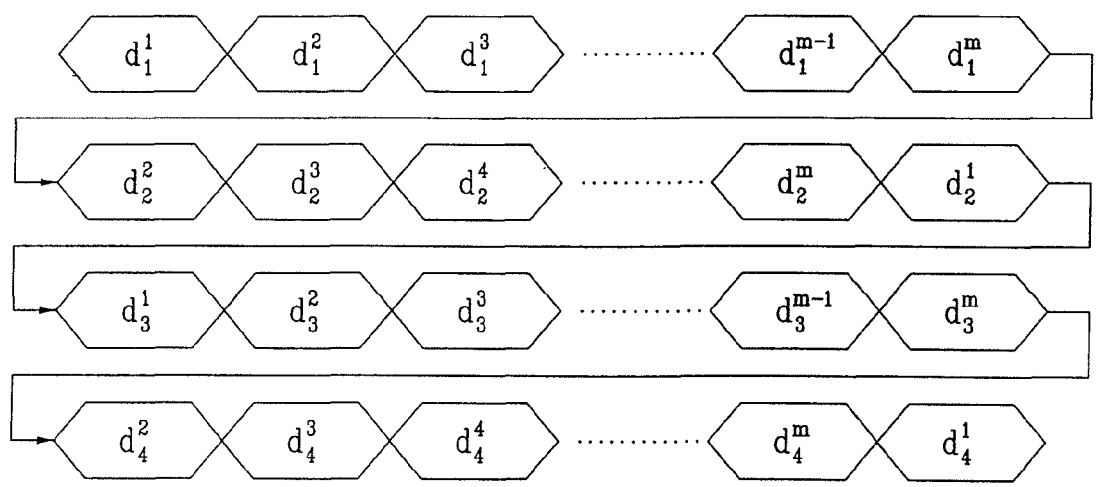
FIG. 6 is a diagram showing waveforms of image signals supplied from a signal controller to a data driver of an LCD according to an embodiment of the present invention.

FIG. 4 shows the connections between pixels and data lines of an LC panel assembly according to an embodiment of the present invention, FIG. 5 is a diagram showing waveforms of data signals applied to adjacent data lines of an LC panel assembly by a data driver of an LCD according to an embodiment of the present invention, and FIG. 6 is a diagram showing waveforms of image signals supplied from a signal controller to a data driver of an LCD according to an embodiment of the present invention.

The pixels in a row of an LCD according to an embodiment of the present invention are connected to data lines on the same hand, while the pixels in adjacent two rows are connected to the data lines on the opposite hands. As shown in FIG. 4, the j-th pixels in odd rows are connected to the data lines $D_j$ on the right hand, while the j-th pixels in even rows are connected to the data lines $D_{j-1}$ on the left hand.

The data voltages applied to adjacent two pixels in a row have opposite polarity, while the data voltages applied to adjacent two pixels in a column have the same polarity. For obtaining this polarity arrangement, two data signals $d_j$ and $d_{j+1}$ applied to adjacent two data lines have opposite polarity, and each of the data signals $d_j$ and $d_{j+1}$ reverses its polarity every row, as shown in FIG. 5.

FIG. 6 shows image data R', G' and B' supplied for the data driver 500 from the signal controller 600. For the odd rows, the signal generator 600 sequentially supplies from the image data $d_1{}_1, d_3{}_1, \ldots$ for the first column to the image data $d_1^m, d_3^m, \ldots$ for the last column. For the even rows, however, since the pixels in the first column are connected to the dummy data line $D_0$, which in turn is connected to the last data line $D_m$, the signal generator 600 sequentially supplies from the image data $d_2^2, d_4^2, \ldots$ for the second column to the image data $d_2^m, d_4^m, \ldots$ for the last column and then, finally supplies the image data $d_2^1, d_4^1, \ldots$ for the first column. For this purpose, the signal generator 600 temporarily stores the image data $d_2^1, d_4^1, \ldots$ for later output.

If the connections between pixels and data lines are opposite to those shown in FIG. 4, that is, the j-th pixels in odd rows are connected to the data lines $D_{j-1}$ on the left hand and the j-th pixels in even rows are connected to the data lines $D_j$ on the right hand, the output sequence of the signal processor 600 for the image data R', G' and B' is changed. In detail, for the odd rows, the signal generator 600 sequentially supplies from the image data $d_1^2, d_3^2, \ldots$ for the second column to the image data $d_1^m, d_3^m, \ldots$ for the last column and then, finally supplies the image data $d_1^1, d_3^1,$ $\ldots$ for the first column, while for the even rows, the signal generator 600 sequentially supplies from the image data $d_2^1, d_4^1, \ldots$ for the first column to the image data $d_2^m, d_4^m, \ldots$ for the last column.

Then, the inversion type for the pixels in the panel assembly 300 is column inversion, while the inversion type for the data lines $D_0$-$D_m$ is dot inversion.

If all the pixels in a column are connected to the same data line $D_0$-$D_m$ according to another embodiment of the present invention, the polarity of adjacent pixels in a row is opposite. The polarity along the columns is subject to either the dot inversion (that adjacent pixels in a column have different polarity) or the column inversion (that adjacent pixels in a column have the same polarity).

The dot inversion controls the polarity of the data signals such that the data signals applied to two adjacent data lines are opposite and the data signals along a data line reverses their polarity whenever the application row is changed.

The column inversion controls the polarity of the data signals such that the data signals applied to two adjacent data lines are also opposite while the data signals along a data line have the same polarity.

In this case, it is not required for rearranging the sequence of the image data R', G' and B'. That is, for all the rows, the signal controller 600 sequentially outputs from the image data $d_1^1, d_2^1, \ldots$ for the first column to the image data $d_1^m, d_2^m, \ldots$ for the last column.

Compared with this another embodiment, the connections between pixels and data lines shown in FIG. 4 have advantages that the column inversion for the pixels of an LC panel assembly 300 particularly having a configuration that a pixel includes two switching elements and the pixels are capacitively coupled by coupling capacitors gives the brightness higher than the dot inversion to improve visibility and decrease flicker. In addition, since the dot inversion for the data lines is still remained, the polarity of the off-current of the switching elements connected to a data line is reversed to decrease the crosstalk.

Next, a method of applying data voltages to an LC panel assembly according to another embodiment of the present invention will be described in detail with reference to FIGS. 7-9.

Figure 7:
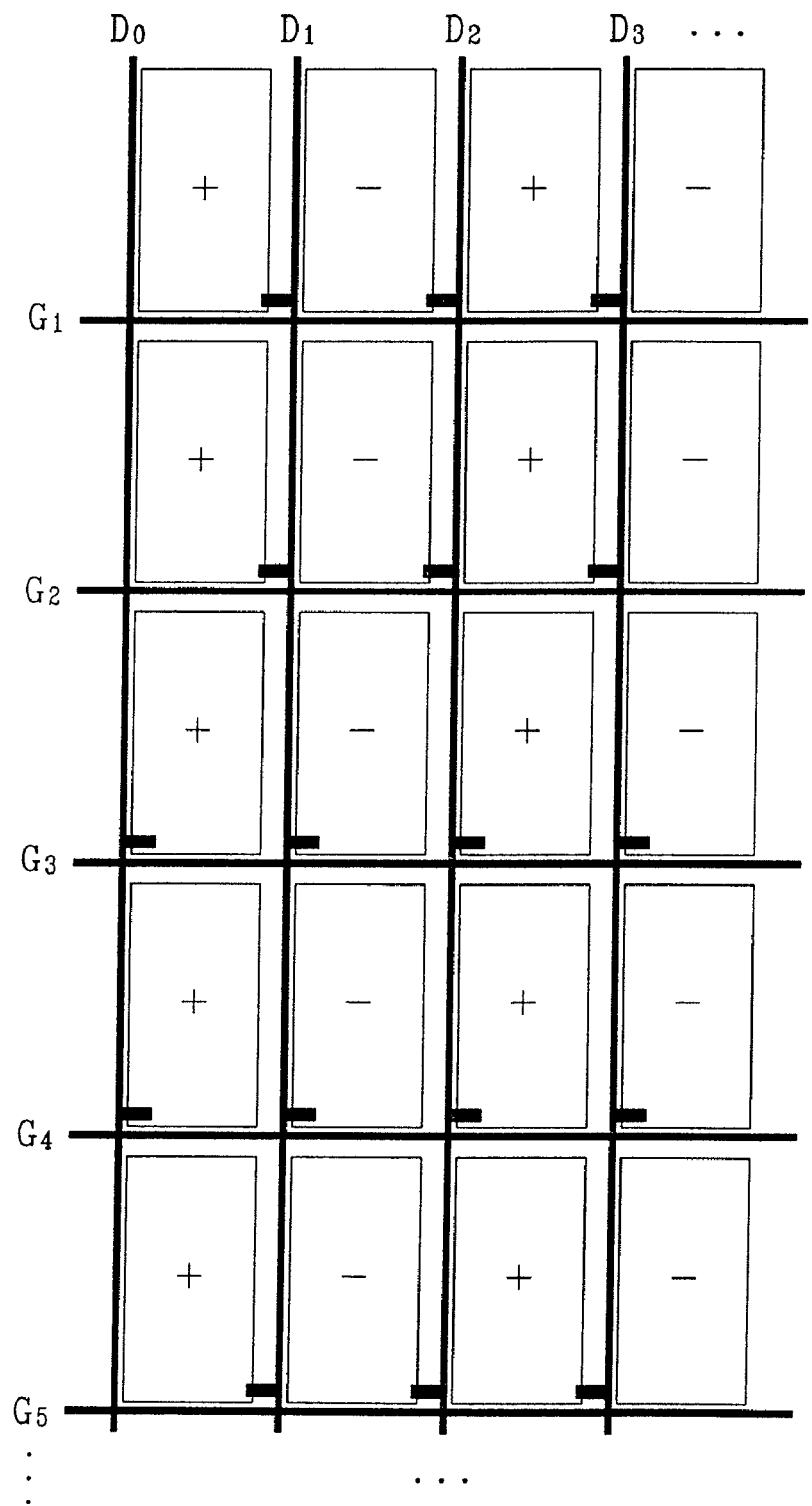
FIG. 7 shows the connections between pixels and data lines of an LC panel assembly according to another embodiment of the present invention.
Figure 8:
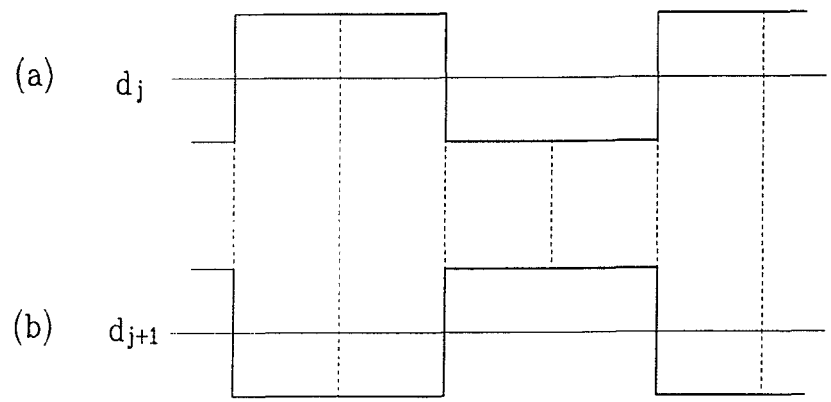
FIG. 8 is a diagram showing waveforms of data signals applied to adjacent data lines of an LC panel assembly according to another embodiment of the present invention.
Figure 9:
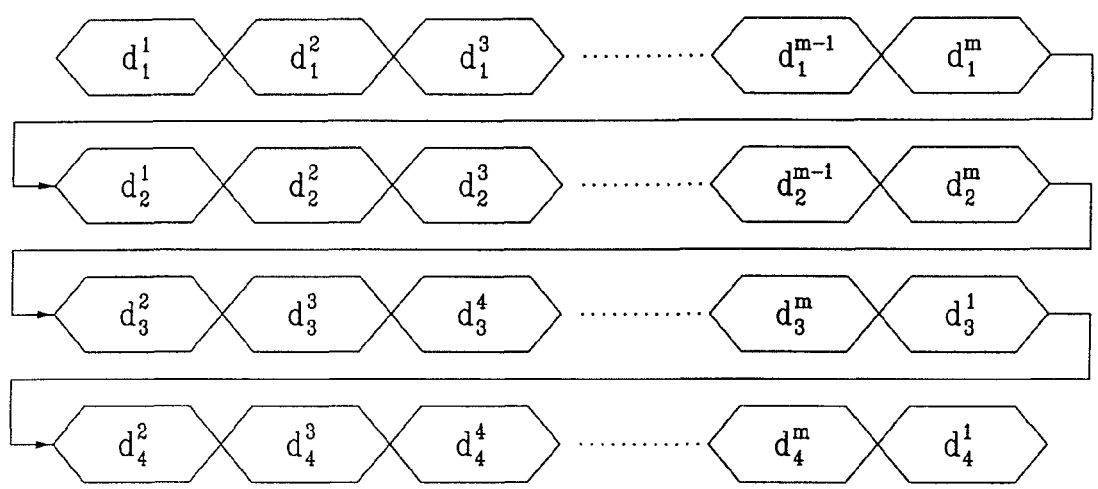
FIG. 9 is a diagram showing waveforms of image signals supplied from a signal controller to a data driver of an LCD according to another embodiment of the present invention.

FIG. 7 shows the connections between pixels and data lines of an LC panel assembly according to another embodiment of the present invention, FIG. 8 is a diagram showing waveforms of data signals applied to adjacent data lines of an LC panel assembly by a data driver of an LCD according to another embodiment of the present invention, and FIG. 9 is a diagram showing waveforms of image signals supplied from a signal controller to a data driver of an LCD according to another embodiment of the present invention.

The connections between pixels and data lines according to another embodiment of the present invention are different from those shown in FIG. 4 in that the connected data lines are reversed every two rows. That is, if the j-th pixels in previous two rows are connected to the data line $D_j$, then the j-th pixels in the next two rows are connected to the data line $D_{j-1}$. As shown in FIG. 7, the j-th pixels in the (4 k+1)-th row (k=0, 1, . . . ) and the (4 k+2)-th row are connected to the data lines $D_j$ on the right hand, while the j-th pixels in the (4 k+3)-th row and the (4 k+4)-th row are connected to the data lines $D_{j-1}$ on the left hand.

As shown in FIG. 7, the polarity arrangement is the same as that shown in FIG. 4. That is, the data voltages applied to adjacent two pixels in a row have opposite polarity, while the data voltages applied to adjacent two pixels in a column have the same polarity. For obtaining this polarity arrangement, two data signals d.sub.j and d.sub.j+1 applied to adjacent two data lines have opposite polarity, and each of the data signals d.sub.j and d.sub.j+1 reverses its polarity every two rows, as shown in FIG. 8.

FIG. 9 shows image data R', G' and B' supplied for the data driver 500 from the signal controller 600. For the (4 k+1)-th and the (4 k+2)-th rows, i.e., for the first row, the second row, the fifth row, the sixth row, and so on, the signal generator 600 sequentially supplies from the image data d.sub.1.sup.1, d.sub.2.sup.1, . . . for the first column to the image data d.sub.1.sup.m, d.sub.2.sup.m, . . . for the last column. For the (4 k+3)-th and the (4 k+4)-th rows, i.e., for the third row, the fourth row, the seventh row, the eighth row, and so on, however, the signal generator 600 sequentially supplies from the image data d.sub.3.sup.2, d.sub.4.sup.2, . . . for the second column to the image data d.sub.3.sup.m, d.sub.4.sup.m, . . . for the last column and then, finally supplies the image data d.sub.3.sup.1, d.sub.4.sup.1, . . . for the first column. For this purpose, the signal generator 600 temporarily stores the image data d.sub.2.sup.1, d.sub.4.sup.1, . . . for later output.

If the connections between pixels and data lines are opposite to those shown in FIG. 7, that is, the j-th pixels in the (4 k+1)-th and the (4 k+2)-th rows are connected to the data lines D.sub.j−1 on the left hand and the j-th pixels in the (4 k+3)-th and the (4 k+4)-th rows are connected to the data lines D.sub.j on the right hand, the output sequence of the signal processor 600 for the image data R', G' and B' is changed. In detail, for the (4 k+1)-th and the (4 k+2)-th rows, the signal generator 600 sequentially supplies from the image data d.sub.1.sup.2, d.sub.2.sup.2−, . . . for the second column to the image data d.sub.1.sup.m, d.sub.2.sup.−m, . . . for the last column and then, finally supplies the image data d.sub.1.sup.1, d.sub.2.sup.1, . . . for the first column, while for the (4 k+3)-th and the (4 k+4)-th rows, the signal generator 600 sequentially supplies from the image data d.sub.3.sup.1, d.sub.4. sup.1, . . . for the first column to the image data d.sub.3.sup.m, d.sub.4.sup.m, . . . for the last column.

Then, the inversion type for the pixels in the panel assembly 300 is column inversion, while the inversion type for the data lines D.sub.0-D.sub.m is two-dot inversion.

The connections between pixels and data lines may be reversed at least every three rows.

Now, an LC panel assembly for an LCD according to an embodiment of the present invention is described in detail with reference to FIGS. 10 to 11C.

Figure 10:
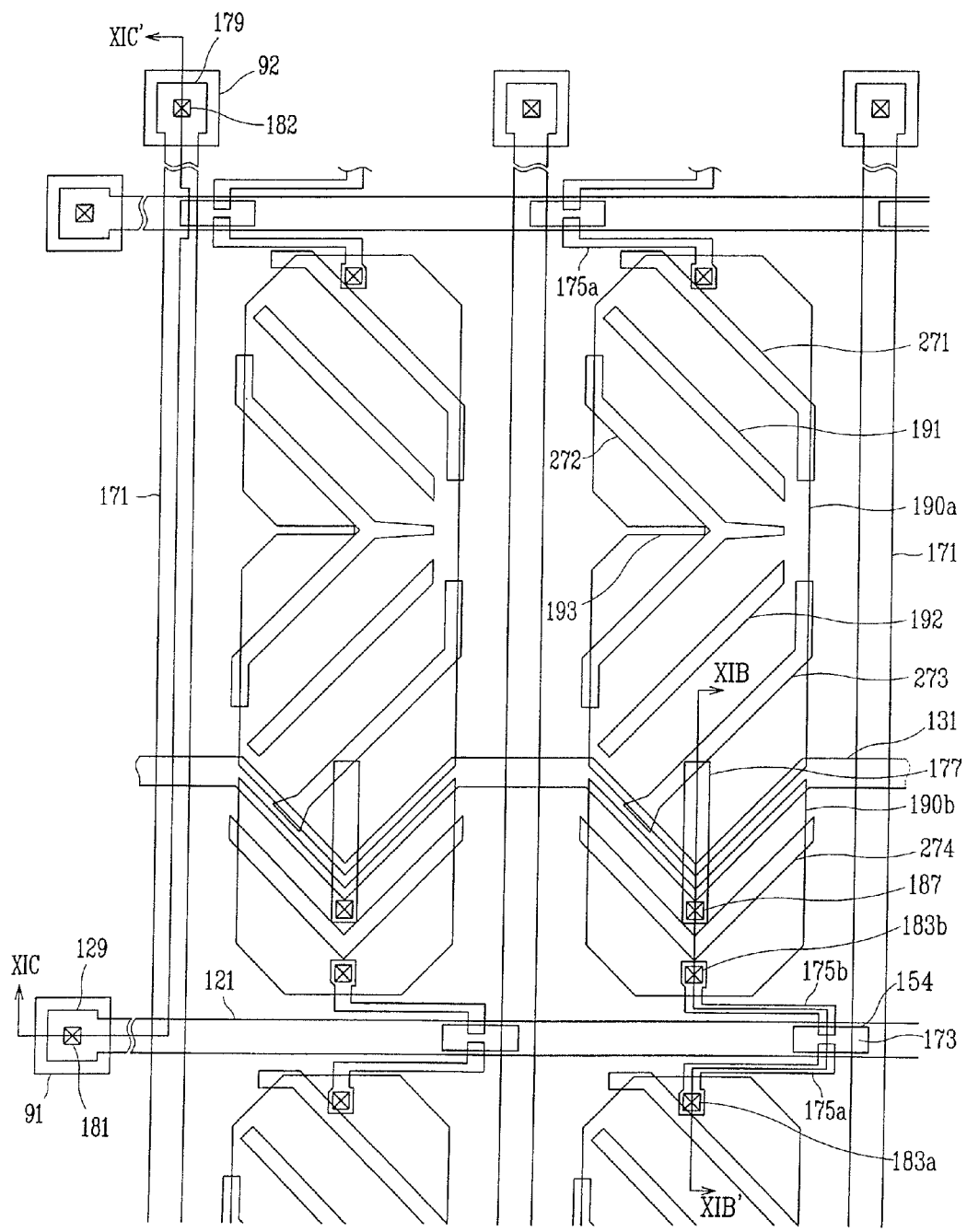
FIG. 10 is a layout view of an LC panel assembly according to an embodiment of the present invention.
Figure 11A:
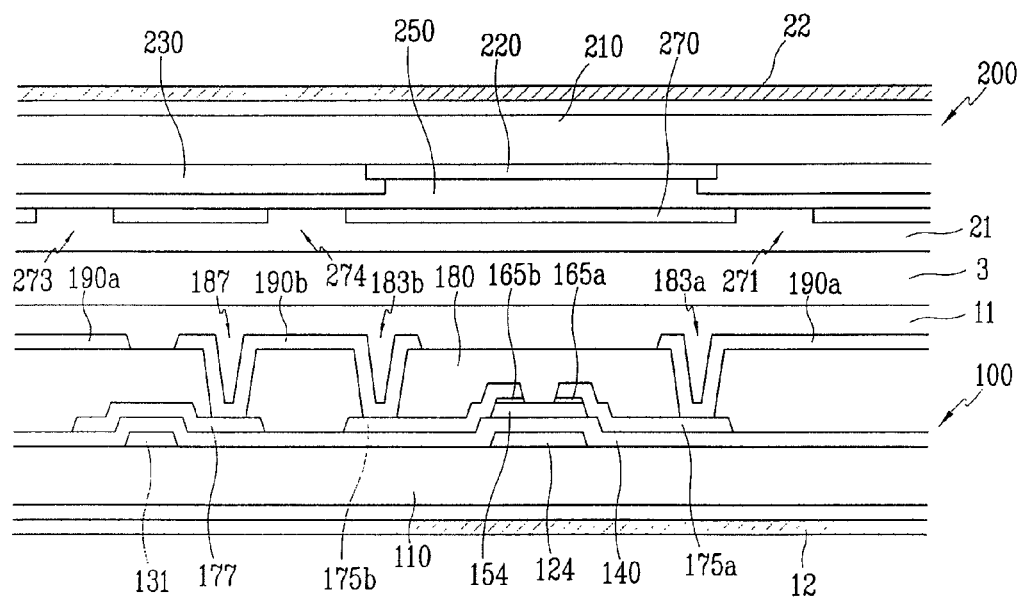
FIG. 11A is a sectional view of the LC panel assembly shown in FIG. 10 taken along the line XIB-XIB'.
Figure 11B:
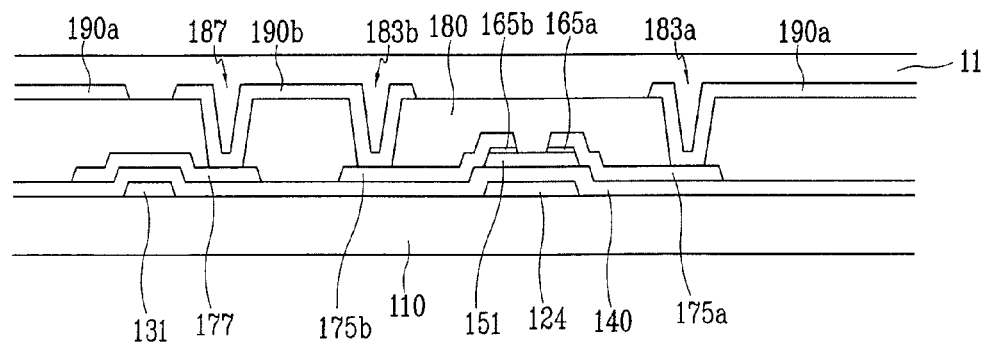
FIG. 11B is a sectional view of a TFT array panel shown in FIG. 11A, which is a portion of the LC panel assembly shown in FIG. 11A except for a color filter array panel and polarization films.

FIG. 10 is a layout view of an LC panel assembly according to an embodiment of the present invention, FIG. 11A is a sectional view of the LC panel assembly shown in FIG. 10 taken along the line XIB-XIB', and FIG. 11B is a sectional view of a TFT array panel shown in FIG. 11A, which is a portion of the LC panel assembly shown in FIG. 11A except for a color filter array panel and polarization films. FIG. 11C is a sectional view of a TFT array panel shown in FIG. 10 taken along the line XIC-XIC'.

Referring to FIG. 11A, an LC panel assembly according to this embodiment includes a TFT array panel 100, a color filter array panel 200 facing the TFT array panel 100, and an LC layer 3 interposed therebetween.

Figure 11C:
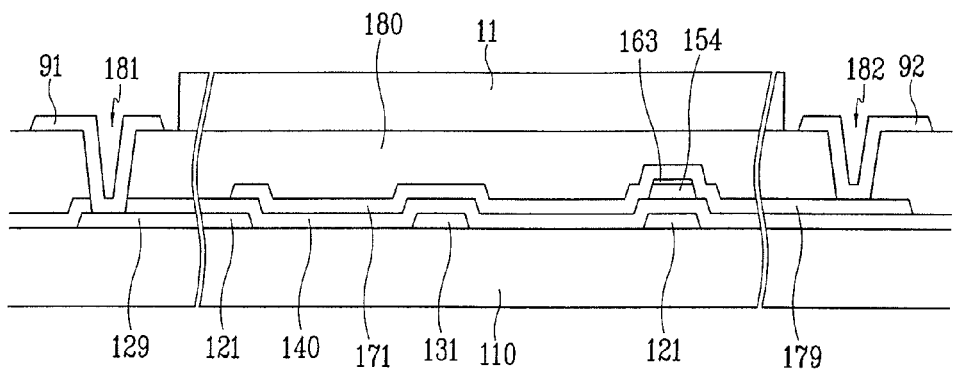
FIG. 11C is a sectional view of a TFT array panel shown in FIG. 10 taken along the line XIC-XIC'.

Referring to FIGS. 10 to 11C, the TFT array panel 100 includes a plurality of gate lines 121 and a plurality of storage electrode lines 131 formed on an insulating substrate 110 preferable made of transparent glass. Each gate line 121 extends substantially in a row direction and includes a plurality of gate electrodes 124. The storage electrode lines 131 extend substantially in the row direction and are partially curved.

A gate insulating layer 140 is formed on the gate lines 121 and the storage electrode lines 131, and a plurality of semiconductor islands 154 is formed on the gate insulating layer 140 opposite the gate electrodes 124. Each semiconductor island 154 is preferably made of amorphous silicon ("a-Si") and forms a channel of a TFT. A plurality of ohmic contacts 163, 165a and 165b preferably made of a-Si heavily doped with N type impurity such as phosphorous (P) are formed on the semiconductor islands 154.

A plurality of data lines 171, a plurality of pairs of drain electrodes 175a and 175b, and a plurality of coupling electrodes 177 are formed on the ohmic contacts 163, 165a and 165b and the gate insulating layer 140.

Each data line 171 extends substantially in a column direction and includes a plurality of source electrodes 173, and each source electrode 173 is located opposite a pair of drain electrodes 175a and 175b separated therefrom with respect to the gate electrode 124. The positions of the source electrodes 173 are altered between a left side and a right side every row, and thus the position of a given source electrode 173 has a nearly bilateral symmetry with the position of a source electrode in a previous row.

Each pair of drain electrodes 175a and 175b extends opposite directions with respect to the gate line 124.

Each coupling electrode 177 extends in the column direction across the storage electrode line 131.

The portions of the semiconductor islands 154 located between the source electrode 173 and the drain electrodes 175a and 175b are exposed, and the ohmic contacts 163, 165a and 165b are disposed only between the semiconductor islands 154 and the data lines 171 and the drain electrodes 175a and 175b.

A passivation layer 180 is formed on the data lines 171, the drain electrodes 175a and 175b, and the coupling electrodes 177. The passivation layer 180 has a plurality of contact holes 183a and 183b exposing end portions of the drain electrodes 175a and 175b and a plurality of contact holes 187 exposing end portions of the coupling electrodes 177. The passivation layer 180 further has a plurality of contact holes 182 exposing end portions 179 of the data lines 171, and the passivation layer 180 and the gate insulating layer 140 have a plurality of contact holes 181 exposing end portions 129 of the gate lines 121.

A plurality of pairs of pixel electrodes 190a and 190b and a plurality of contact assistants 91 and 92 are formed on the passivation layer 180. The pixel electrodes 190a and 190b and the contact assistants 91 and 92 are preferably made of a transparent conductive material such as indium-tin-oxide (ITO) and indium-zinc-oxide (IZO) or a reflective material.

Each pair of pixel electrodes 190a and 190b includes a lower pixel electrode 190a and an upper pixel electrode 190b connected to the drain electrodes 175a and 175b through the contact holes 183a and 183b, respectively. The upper electrode 190b is connected to the coupling electrode 177 through the contact hole 187 and the lower electrode 190a overlaps the coupling electrode 177 such that the lower pixel electrode 190a of an upper pixel and the upper pixel electrode 190b of a lower pixel are capacitively coupled. In addition, the lower pixel electrode 190a of an upper pixel and the upper pixel electrode 190b of a lower pixel are located opposite across the storage electrodes line 131 and overlap the storage electrode line 131 to form a plurality of storage capacitors. The edges of the pixel electrodes 190a and 190b opposite across the storage electrode line 131 are curved to form V shapes, and the V-shaped edge of the pixel electrode 190a is convex, while that of the pixel electrode 190b is concave.

Each lower pixel electrode 190a has upper, lower and central linear cutouts 191-193. The central cutout 193 is located at the middle portion in the column direction and enters into the pixel electrode 190a from the left to the right, thereby partitioning the pixel electrode 190a into upper and lower partitions. The upper and the lower cutouts 191 and 192 obliquely extend in the upper and the lower partitions, respectively, and are located symmetrically with respect to the central cutout 193.

The contact assistants 91 and 92 are connected to the exposed end portions 129 and 179 of the gate lines 121 and the data lines 171 through the contact holes 181 and 182, respectively, and provided for protecting the exposed end portions 129 and 179 but is optional.

An alignment layer 11 is coated on the entire surface of the TFT array panel 100 except for the contact assistants 91 and 92.

One gate electrode 124, one source electrode 173, and a pair of drain electrodes 175a and 175b along with one semiconductor island 154 form a pair of TFTs respectively connected to the pixel electrodes 190a and 190b.

Referring to FIGS. 10 and 11B, the color filter array panel 200 includes a black matrix 220 formed on an insulating substrate 210 preferably made of transparent glass. The black matrix 220 defines a plurality of windows where a plurality of red, green and blue color filters 230 are formed. An overcoat is formed on the color filters and a common electrode 270 is formed thereon. The common electrode 270 is preferably made of a transparent conductive material such as ITO and IZO, and has a plurality of sets of four linear cutouts 271-274. Three 271-273 of the cutouts 271-274 overlap the lower pixel electrode 190a to partition the pixel electrode 190a along with the cutouts 191-193 into a plurality of subareas. The cutout 274 having a V shape overlap the upper electrode 190b to bisect the upper pixel electrode 190b into two subarea. An alignment layer 21 is coated on the entire surface of the color filter array panel 200.

Each subarea defined by the cutouts 191-193 and 271-273 has substantially a shape of a tetragon having two major edges making an angle of about 45 degrees with the gate lines 121 and the data lines 171. The subareas defined by edges of the upper pixel electrode 190b and the cutout 274 have V shapes, which are combinations of two tetragons.

A pair of polarizers 12 and 22 are attached to outer surfaces of the panels 100 and 200, respectively. The polarization axes of the polarizers 12 and 22 are crossed and substantially parallel to the gate lines 121 or the data lines 171.

The molecules of the LC layer 3 are aligned such that their major axes are substantially perpendicular to the surfaces of the panels 100 and 200 in absence of electric field.

Next, a method of manufacturing the TFT array panel shown in FIGS. 10 to 11C according to an embodiment of the present invention is described in detail with reference to FIGS. 12A to 15C as well as FIGS. 10 to 11C.

Figure 12A:
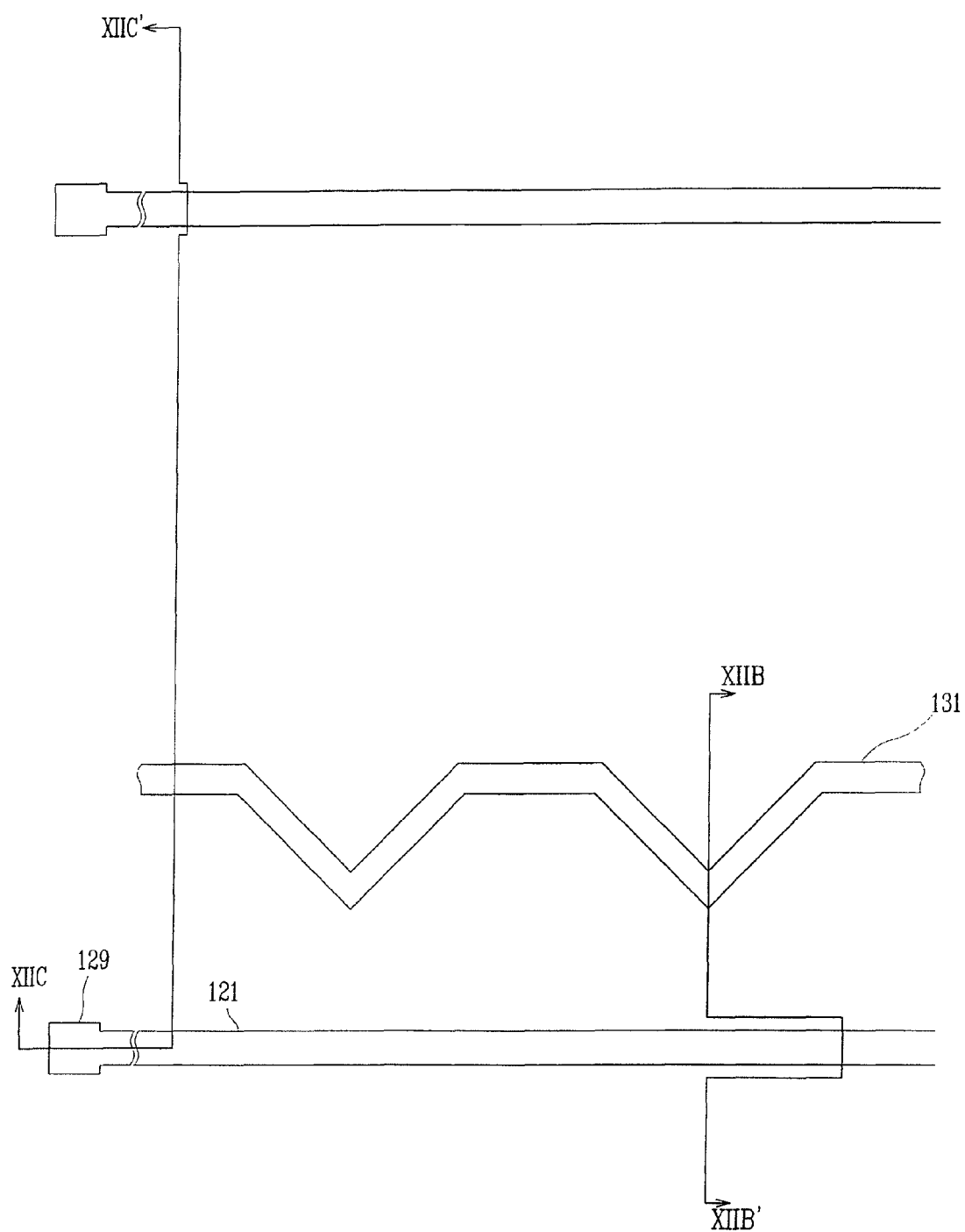
FIGS. 12A to 15C are layout views and sectional views of the TFT array panel shown in FIGS. 10, 11B and 11C in intermediate steps of a manufacturing method thereof according to an embodiment of the present invention.
Figure 12B:
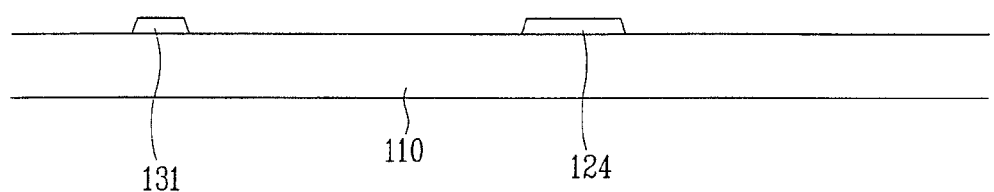
Figure 12C:
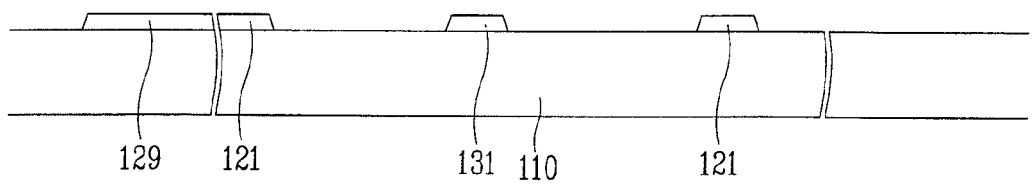

As shown in FIGS. 12A to 12C, a plurality of gate lines 121 and a plurality of storage electrode lines 131 are formed on a glass substrate 110.

Figure 13A:
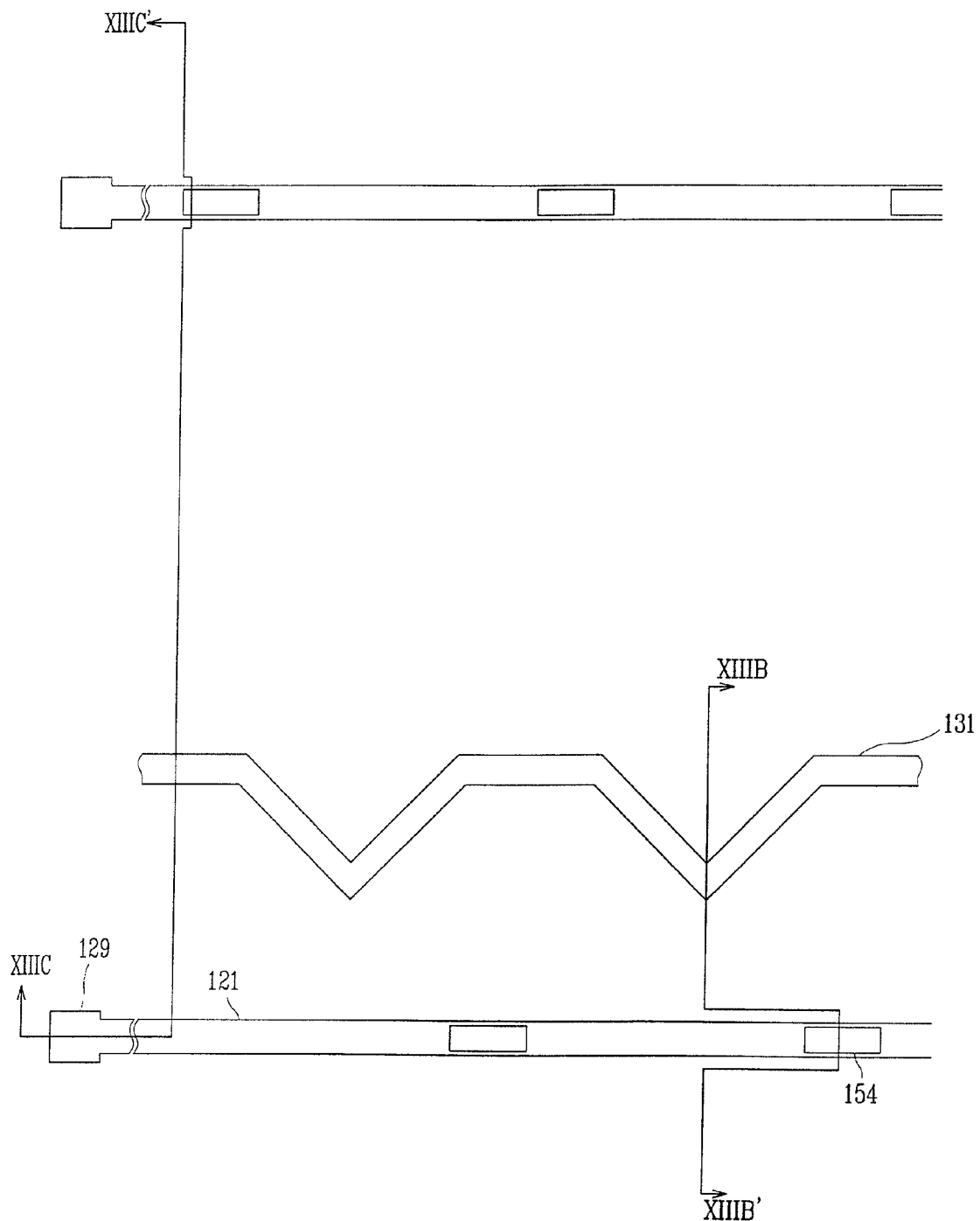
Figure 13B:
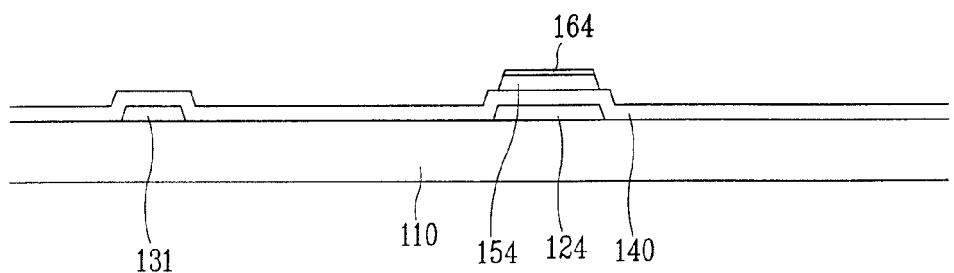
Figure 13C:
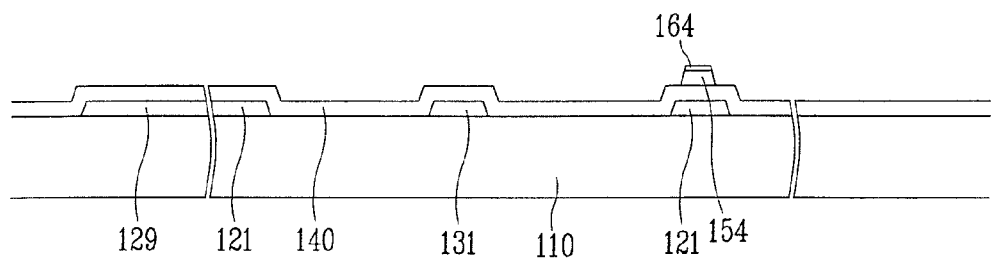

As shown in FIGS. 13A to 13C, a SiNx gate insulating layer 140, a semiconductor layer preferably made of amorphous silicon, and a doped amorphous silicon layer are deposited and the doped amorphous silicon layer and the semiconductor layer are patterned to form a plurality of islands 164 and 154.

Figure 14A:
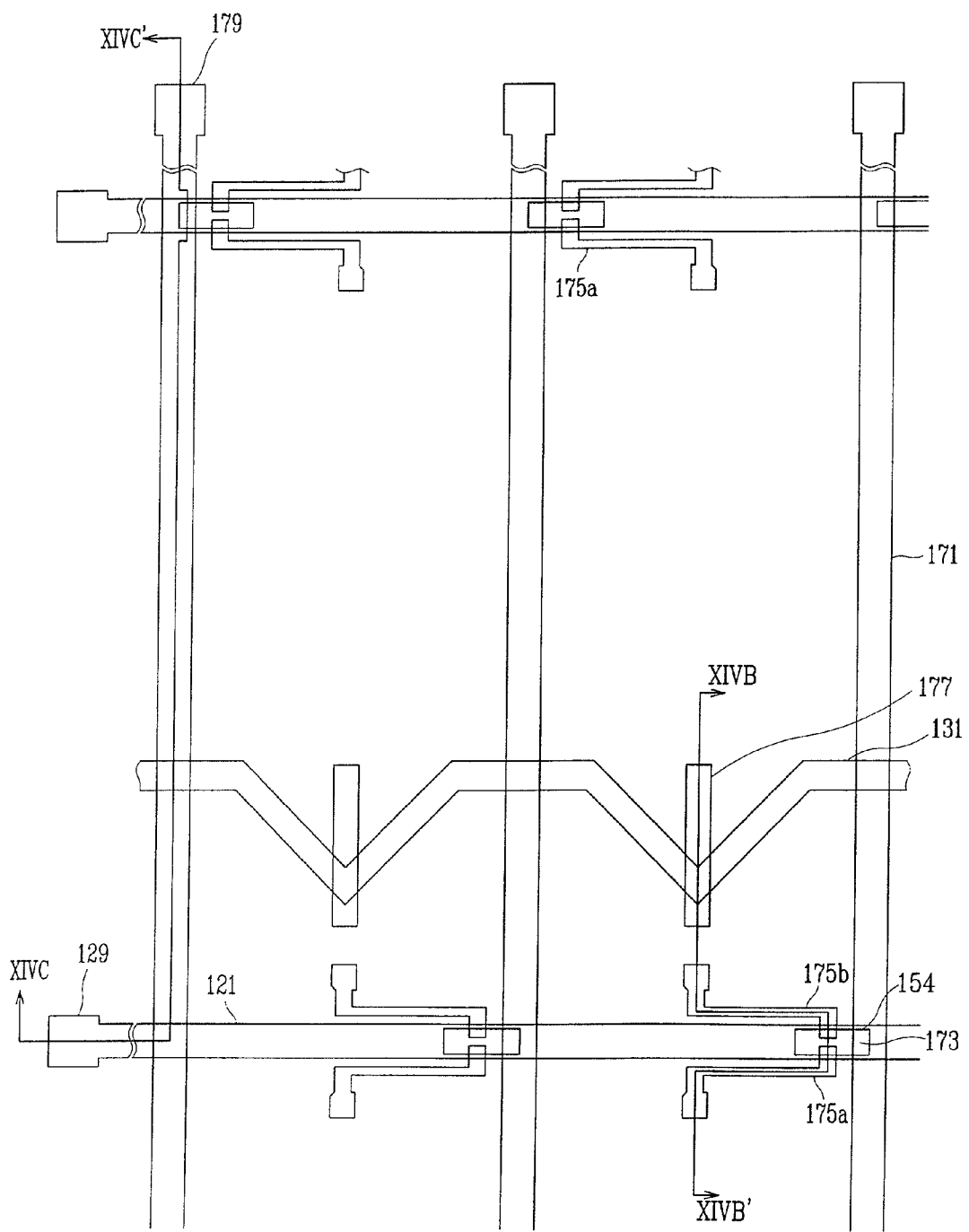
Figure 14B:
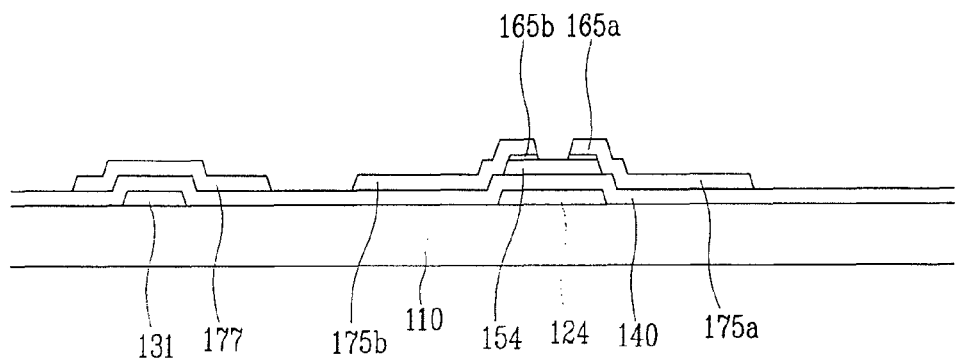
Figure 14C:
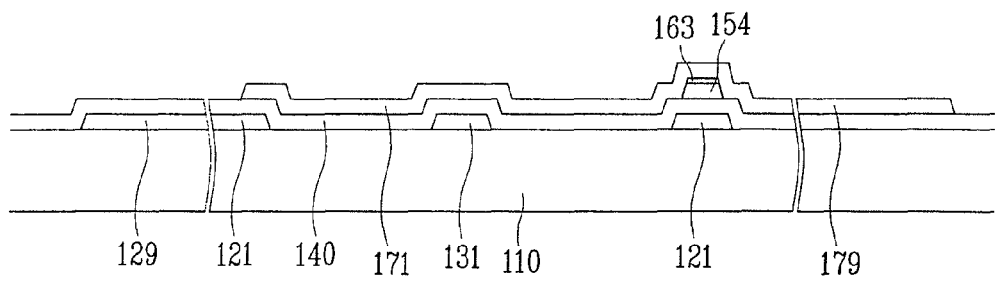

As shown in FIGS. 14A to 14C, after forming a plurality of data lines 171, a plurality of drain electrodes 175a and 175b, and a plurality of coupling electrodes 177, portions of the doped amorphous silicon islands 164, which are not covered with the data lines 171, the drain electrodes 175a and 175b, and the coupling electrodes 177, are removed to expose underlying portions of the semiconductor islands 154. In order to stabilize the exposed surface of the semiconductor layer 154, oxygen plasma treatment is preferably performed.

Figure 15A:
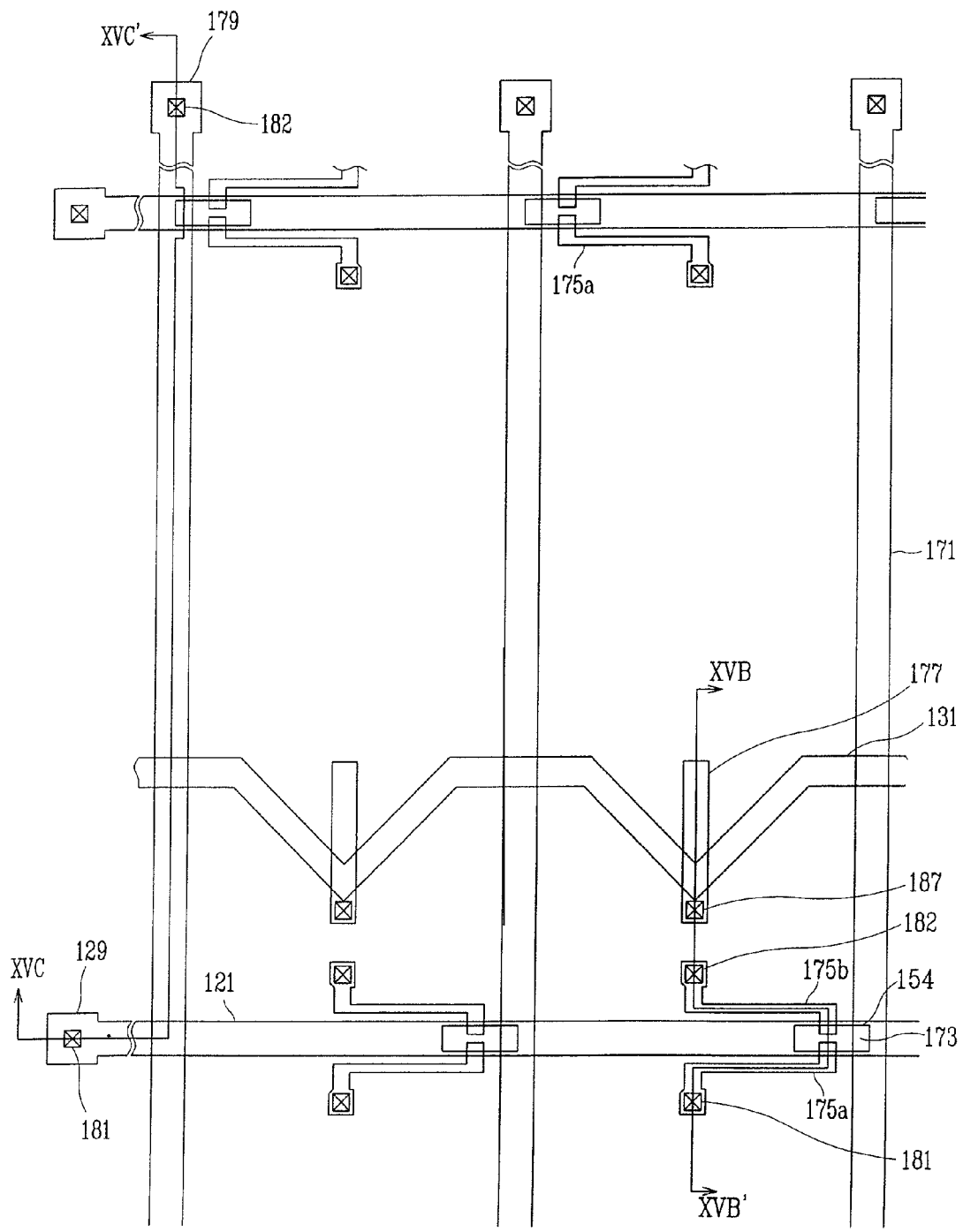
Figure 15B:
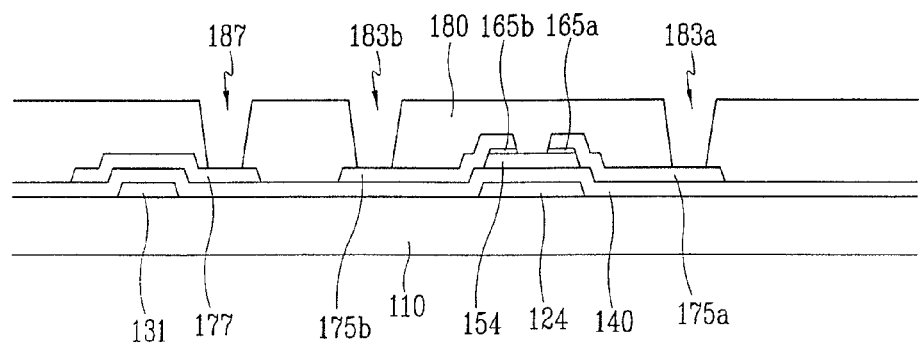
Figure 15C:
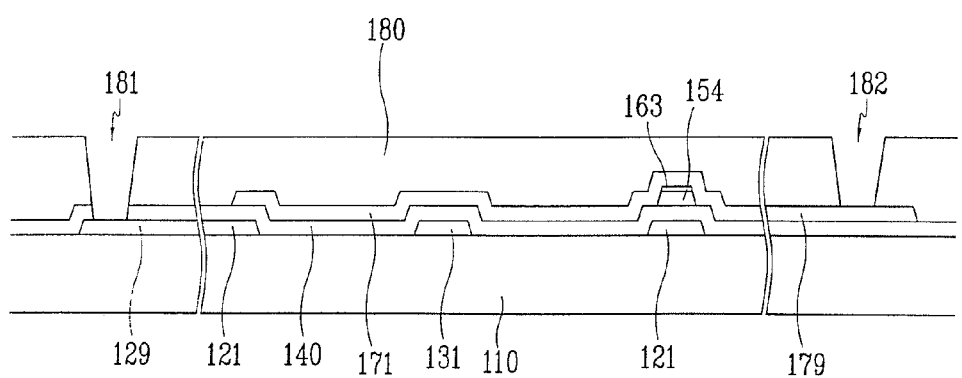

As shown in FIGS. 15A to 15C, a passivation layer 180 is formed by coating or deposition such as plasma-enhanced chemical vapor deposition (PECVD) of silicon nitride or a photosensitive organic material having good planarization characteristic on the substrate 110. The passivation layer 180 together with the gate insulating layer 140 is photo-etched to form a plurality of contact holes 183a-185 exposing the drain electrodes 175a and 175b, the coupling electrodes 177, end portions 129 and 179 of the gate lines 121 and the data lines 171, respectively.

Referring to FIGS. 10 to 11C, a transparent conductive material is deposited and photo-etched to form a plurality of pixel electrodes 190a and 190b and a plurality of contact assistants 91 and 92. The pixel electrodes 190a and 190b are connected to the drain electrodes 175a and 175b through the contact holes 183a and 183b and to the coupling electrodes 177 through the contact holes 187. The contact assistants 91 and 92 are connected to the exposed end portions 129 and 179 of the gate lines 121 and the data lines 171 through the contact holes 181 and 182, respectively.

Finally, an alignment layer 11 is coated on the entire surface of the TFT array panel 100 and, if necessary, subject to surface treatment.

Now, an LC panel assembly of an LCD according to another embodiment of the present invention is described in detail with reference to FIGS. 16 to 17B.

Figure 16:
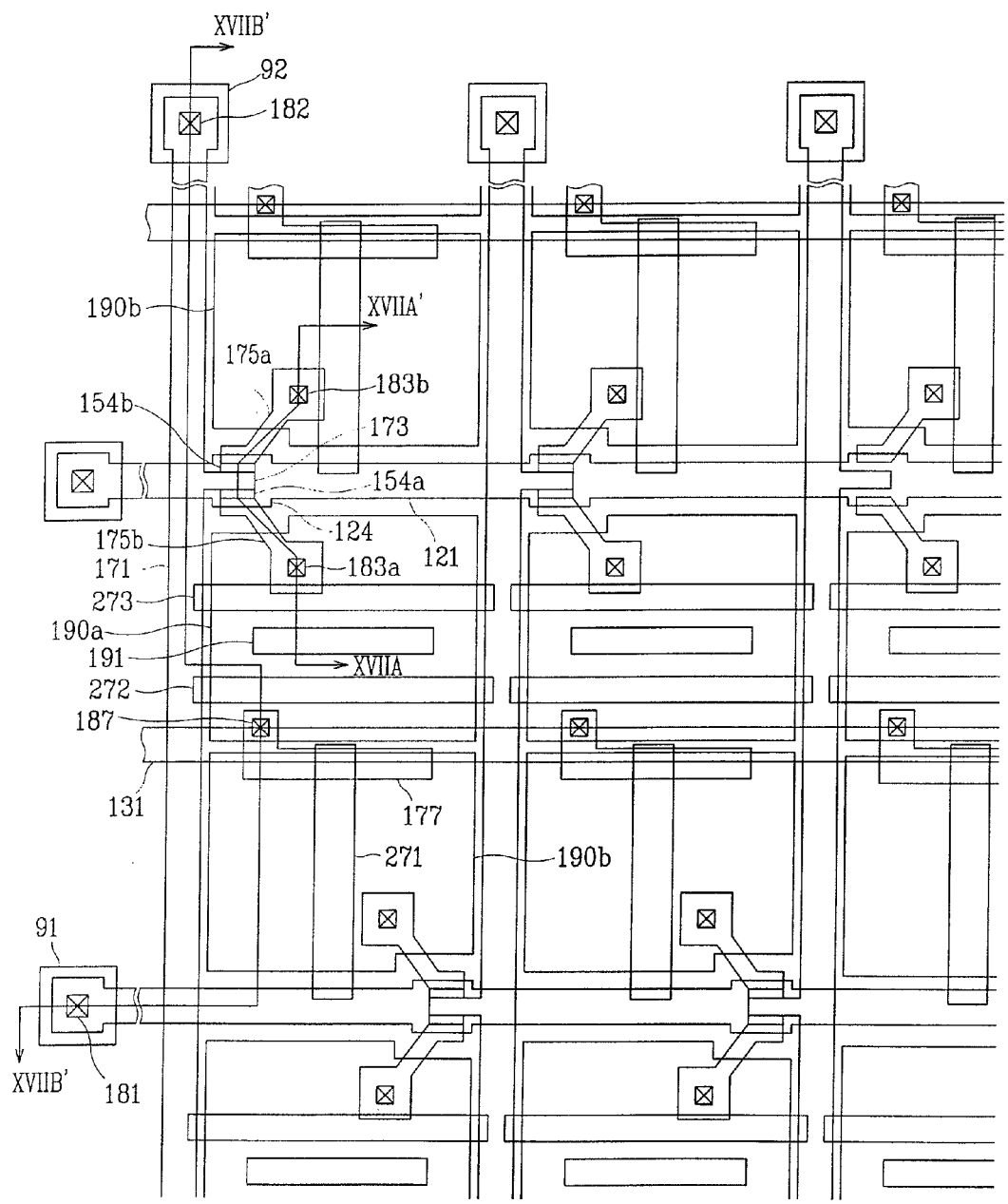
FIG. 16 is a layout view of a TFT array panel for an LCD according to another embodiment of the present invention.
Figure 17A:
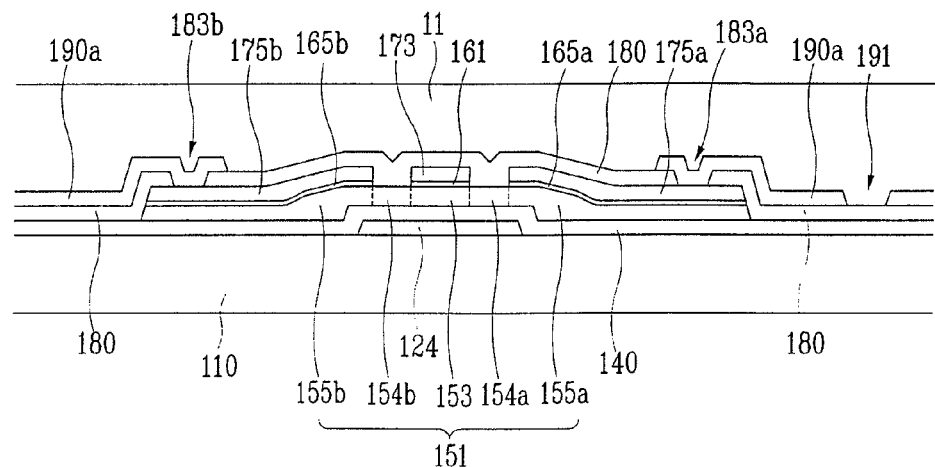
FIGS. 17A and 17B are sectional views of the TFT array panel shown in FIG. 16 taken along the lines XVIIA-XVIIA' and XVIIB-XVIIB', respectively.
Figure 17B:
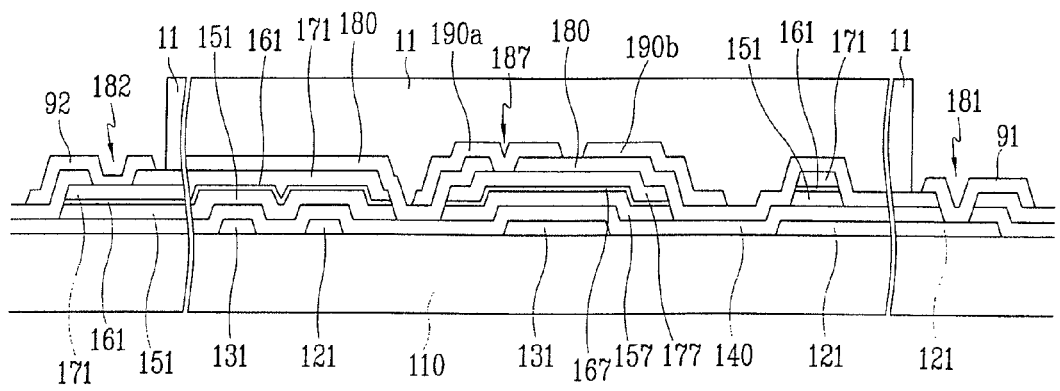

FIG. 16 is a layout view of a TFT array panel for an LCD according to another embodiment of the present invention, and FIGS. 17A and 17B are sectional views of the TFT array panel shown in FIG. 16 taken along the lines XVIIA-XVIIA' and XVIIB-XVIIB', respectively.

An LCD according to this embodiment also includes a TFT array panel 100, a color filter panel 200, and an LC layer 3 interposed therebetween.

A TFT array panel 100 includes a plurality of gate lines 121 and a plurality of storage electrode lines 131 are formed on an insulating substrate 110 preferably made of transparent glass. Each gate line 121 extends substantially in a row direction and includes a plurality of expansions forming gate electrodes 124. Each storage electrode line 131 extends substantially parallel to the gate lines and may include a plurality of branches.

A gate insulating layer 140 is formed on the gate lines 121 and the storage electrode lines 131. A plurality of semiconductor stripes and islands 151 and 157 preferably made of hydrogenated a-Si are formed on the gate insulating layer 140. Each semiconductor stripe 151 includes a plurality of pairs of portions 154a and 154b overlapping the gate electrodes 124 to form channels of TFTs. A plurality of ohmic contact stripes and islands 161, 165a, 165b and 167 preferably made of silicide or hydrogenated a-Si heavily doped with n type impurity such as P are formed on the semiconductor stripes and islands 151 and 157.

A plurality of data lines 171, a plurality of pairs of drain electrodes 175a and 175b, and a plurality of coupling electrodes 177 are formed on the ohmic contact stripes and islands 161, 165a, 165b and 167, respectively. Each data line 171 extends along the semiconductor stripe 151 and includes a plurality of source electrodes 173 extending therefrom and located on the gate lines 121. The drain electrodes 175a and 175b are located opposite each other with respect to the source electrodes 173 and extend upward and downward from the gate electrodes 124.

Each coupling electrode 177 extends substantially in the row direction and partly overlaps the storage electrode line 131.

The ohmic contacts 163, 165a, 165b and 167 are disposed only between the semiconductor stripes and islands 151 and 154 and the data lines 171, the drain electrodes 175a and 175b and the coupling electrodes 177.

The data lines 171 and the drain electrodes 175a and 175b have substantially the same planar shape as the ohmic contact stripes and islands 161, 165a and 165b, and the semiconductor stripes 151 have substantially the same planar shape as the data lines 171 and the drain electrodes 175a and 175b except for channel portions 154a and 154b located between the data lines 171 and the drain electrodes 175a and 175b. The coupling electrodes 177 have substantially the same planar shape as the ohmic contact islands 167 and the semiconductor islands 157.

A passivation layer 180 preferably made of silicon nitride or organic insulator is formed on the data lines 171, the drain electrodes 175a and 175b and the coupling electrodes 177 and the channel portions 154a and 154b of the semiconductor stripes 151.

The passivation layer 180 is provided with a plurality of contact holes 183a, 183b and 187 respectively exposing end portions of the drain electrodes 175a and 175b and the coupling electrodes 177, and a plurality of contact holes 187 exposing end portions of the data lines 171. The gate insulating layer 140 and the passivation layer 180 are provided with a plurality of contact holes 183a exposing end portions of the gate lines 121.

A plurality of pairs of pixel electrodes 190a and 190b and a plurality of contact assistants 91 and 92 are formed on the passivation layer 180. The pixel electrodes 190a and 190b and the contact assistants 91 and 92 are preferably made of a transparent conductive material such as indium-tin-oxide (ITO) and indium-zinc-oxide (IZO) or a reflective material.

Each pair of pixel electrodes 190a and 190b includes a lower pixel electrode 190a and an upper pixel electrode 190b connected to the drain electrodes 175a and 175b through the contact holes 183a and 183b, respectively. The upper electrode 190b is connected to the coupling electrode 177 through the contact hole 187 and the lower electrode 190a overlaps the coupling electrode 177 such that the lower pixel electrode 190a of an upper pixel and the upper pixel electrode 190b of a lower pixel are capacitively coupled. In addition, the lower pixel electrode 190a of an upper pixel and the upper pixel electrode 190b of a lower pixel are located opposite across the storage electrodes line 131 and overlap the storage electrode line 131 to form a plurality of storage capacitors.

Each lower pixel electrode 190a has a linear cutout 191 extending in the row direction. Each lower pixel electrode 190 may further have at least one cutout extending in the row direction, and each upper pixel electrode may have at least one cutout extending in the column direction. It is preferable that an area occupied by the lower pixel electrode 190a have a value of about 30 to 70 percents of the total area of the lower and the upper pixel electrodes 190a and 190b.

The contact assistants 91 and 92 are connected to the end portions 129 and 179 of the gate lines 121 and the data lines 171 through the contact holes 181 and 182, respectively.

An alignment layer 11 is coated on the entire surface of the TFT array panel 100 except for the contact assistants 91 and 92.

The color filter array panel 200 according to this embodiment has a structure similar to that shown in FIG. 11A. That is, the color filter array panel 200 also includes a black matrix 220, a plurality of color filters 230, a common electrode 270 and an alignment layer 21. However, the common electrode 270 has a plurality of sets of cutouts 271-273 having shapes and positions different from those shown in FIGS. 10 and 11A. A set of cutouts include a longitudinal cutout 271 extending in the column direction and two transverse cutouts 272 and 273 extending in the row direction. The longitudinal cutout 271 bisects the upper pixel electrode 190b into two subareas arranged in the row direction, and the transverse cutouts 272 and 273 are located opposite across the cutout 191 of the lower pixel electrode 190a and quarter the lower pixel electrode 190a into four quarter subareas arranged in the column direction.

According to another embodiment of the present invention, the coupling electrodes 177 are formed of the same layer as the gate lines 121, and in this case, the coupling electrodes 177 should not be connected to the storage electrodes lines 131.

Now, a method of manufacturing the TFT array panel shown in FIGS. 16, 17A and 17B according to another embodiment of the present invention is described in detail with reference to FIGS. 18A to 20C as well as FIGS. 16, 17A and 17B.

FIGS. 18A to 20C are layout views and sectional views of the TFT array panel shown in FIGS. 16, 17A and 17B in intermediate steps of a manufacturing method thereof according to another embodiment of the present invention.

Figure 18A:
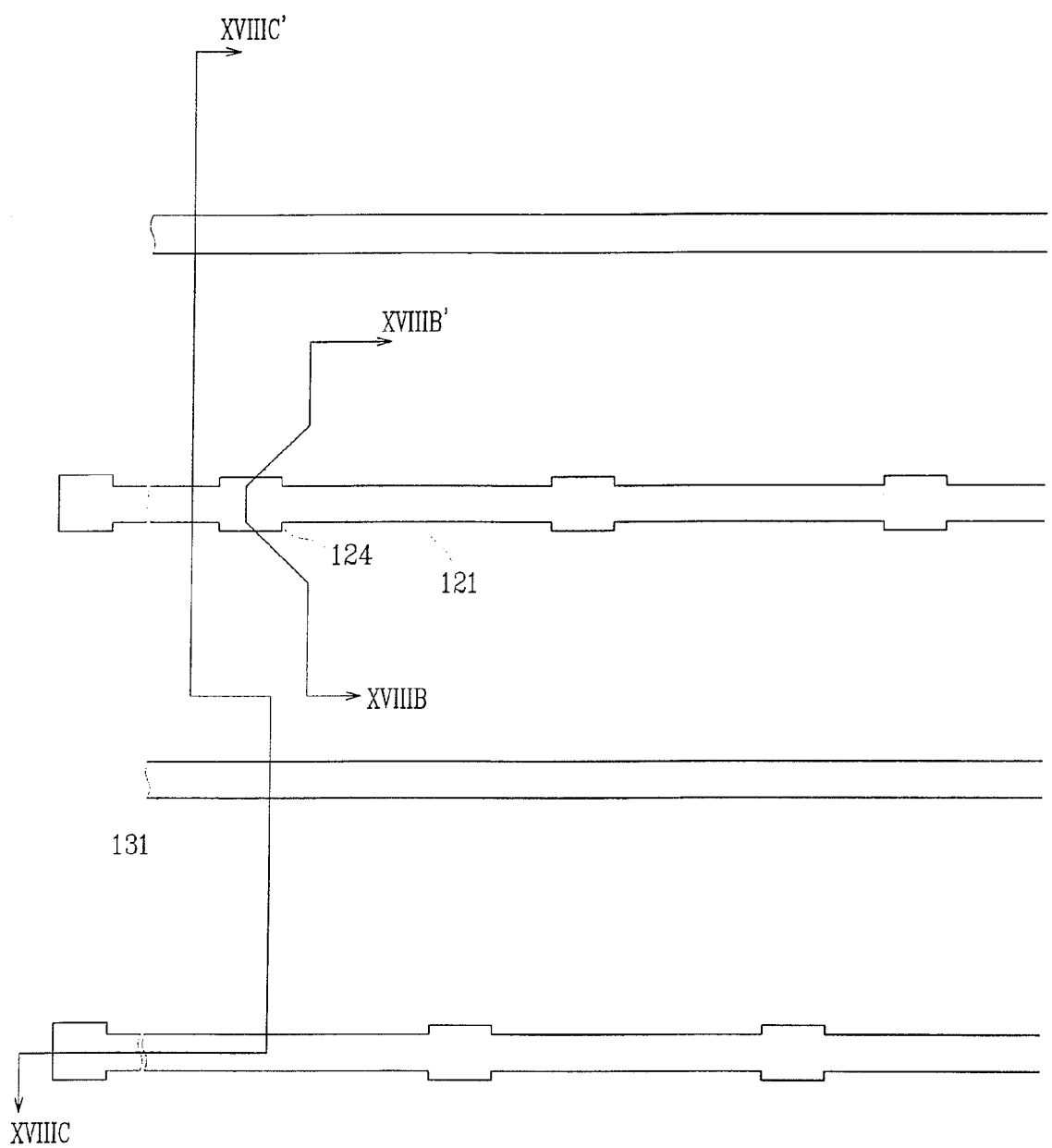
FIGS. 18A to 20C are layout views and sectional views of the TFT array panel shown in FIGS. 16, 17A and 17B in intermediate steps of a manufacturing method thereof according to another embodiment of the present invention.
Figure 18B:
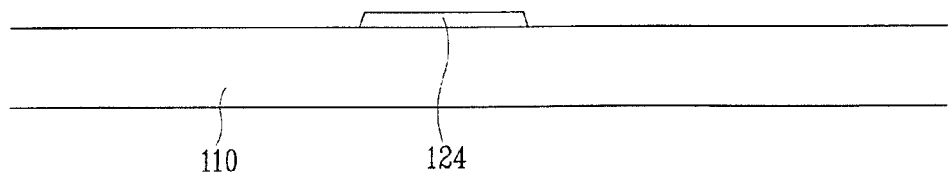
Figure 18C:
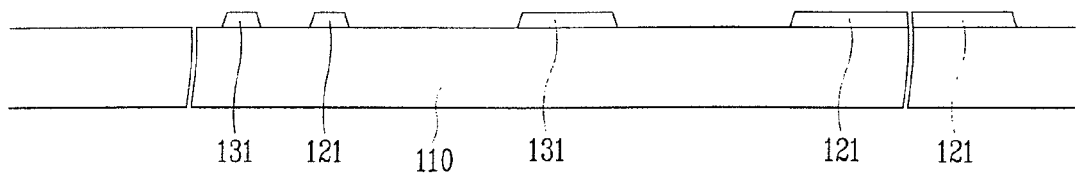

As shown in FIGS. 18A to 18C, a plurality of gate lines 121 and a plurality of storage electrode lines 131 are formed on an insulating substrate 110.

Figure 19A:
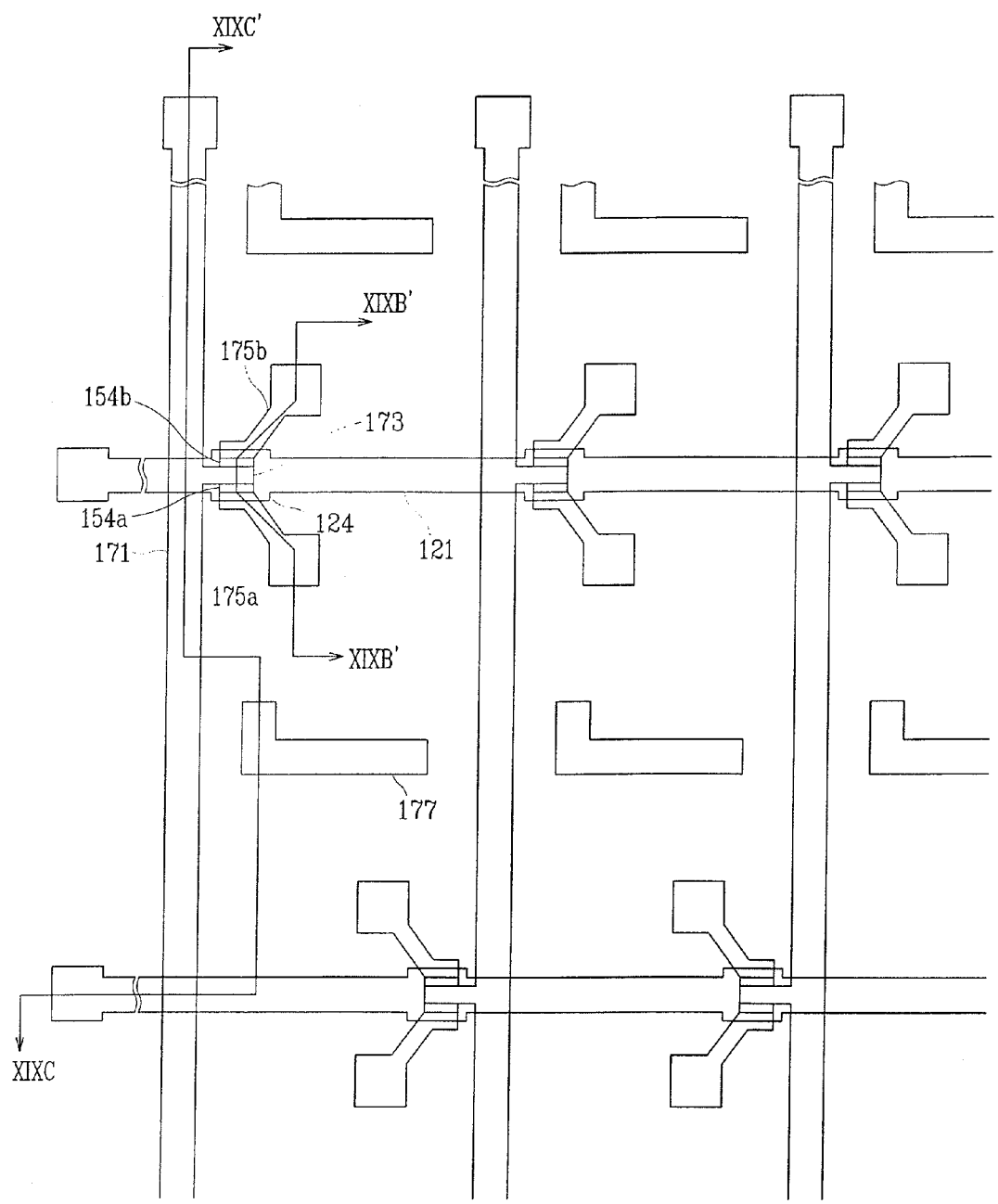
Figure 19B:
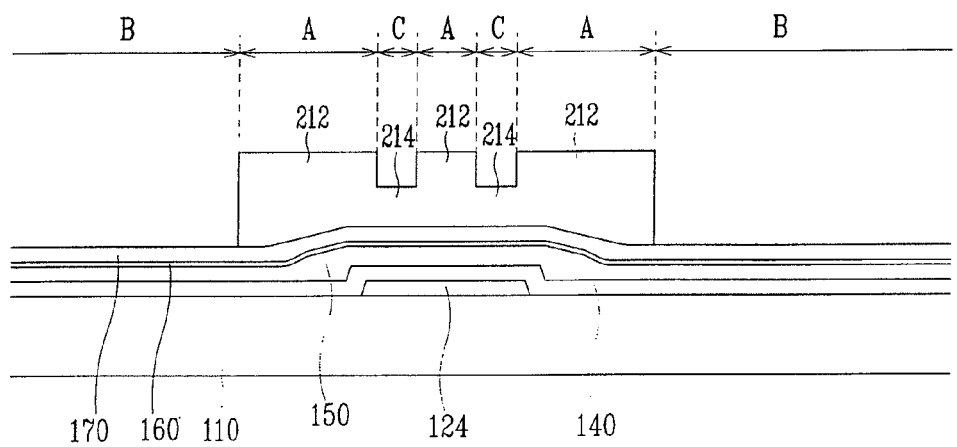
Figure 19C:
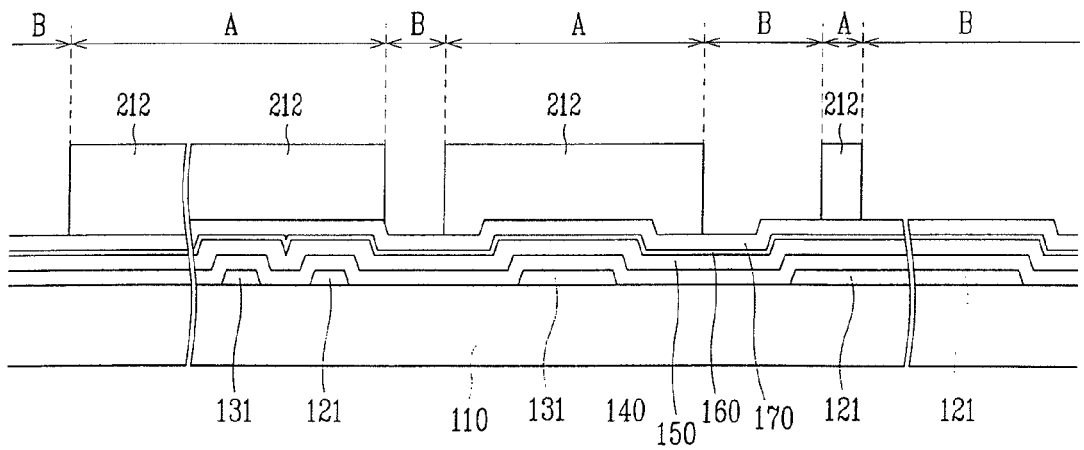
Figure 19D:
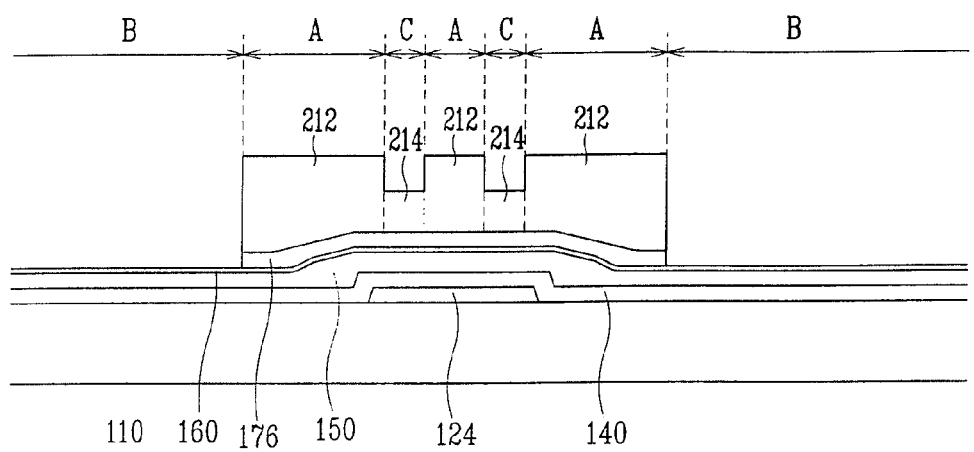
Figure 19E:
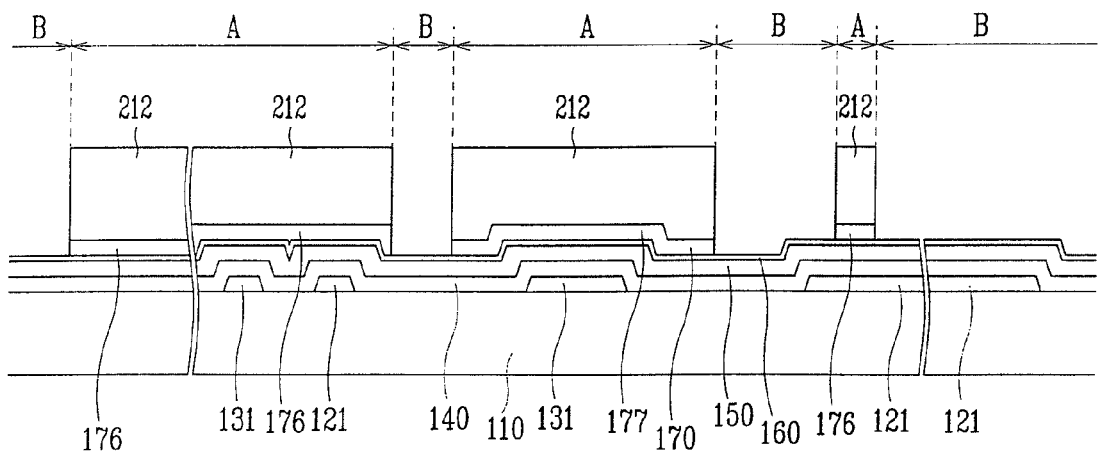

A silicon nitride gate insulating layer 140 with thickness of about 1,500-5,000.ANG., an intrinsic a-Si semiconductor layer 150 with thickness of about 500-2,000.ANG., and a doped a-Si layer 160 with thickness of about 300-600.ANG., and a metal layer 170 with thickness of about 1,500-3,000.ANG. are sequentially deposited by CVD and sputtering, and a photoresist film with thickness of about 1-2 microns is coated thereon. Thereafter, the photoresist film is exposed to light through a photo mask (not shown) and is developed as shown in FIGS. 19B and 19C.

The photoresist film has position-dependent thickness and, for example, includes first to third portions having thickness decreasing in sequence. In FIGS. 19B and 19C, the first and the second portions are indicated by reference numerals 212 and 214, while there is no numeral indicating the third portions since the third portions are shown to have zero thickness and to expose the underlying metal layer 170. The ratio of the thickness of the photoresist film 212 and 214 is adjusted depending on process conditions of subsequent process steps, and it is preferable that the thickness of the second portion is equal to or less than a half of that of the first portion, for example, equal to or less than 4,000.ANG.

The position-dependent thickness of the photoresist film is obtained by several techniques, for example, by providing semi-transparent areas on the exposure mask as well as transparent areas and opaque areas. The semi-transparent areas alternatively have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. That is, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist film 212 and 214 enables to selectively etch the underlying layers when using suitable process conditions.

A plurality of data lines 171, a plurality of drain electrodes 175a and 175b and a plurality of coupling electrodes 177 as well as a plurality of ohmic contact stripes and islands 161, 165a, 165b and 167 and a plurality of semiconductor stripes and islands 151 and 157 are obtained by a series of etching steps.

Figure 19F:
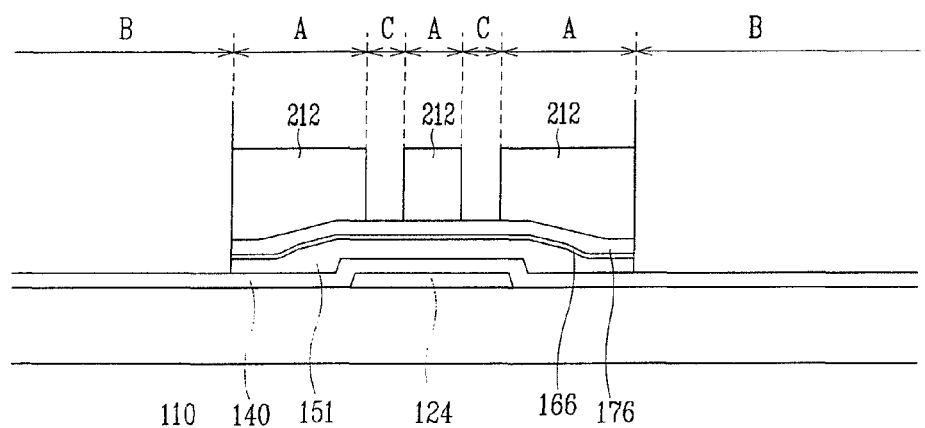
Figure 19G:
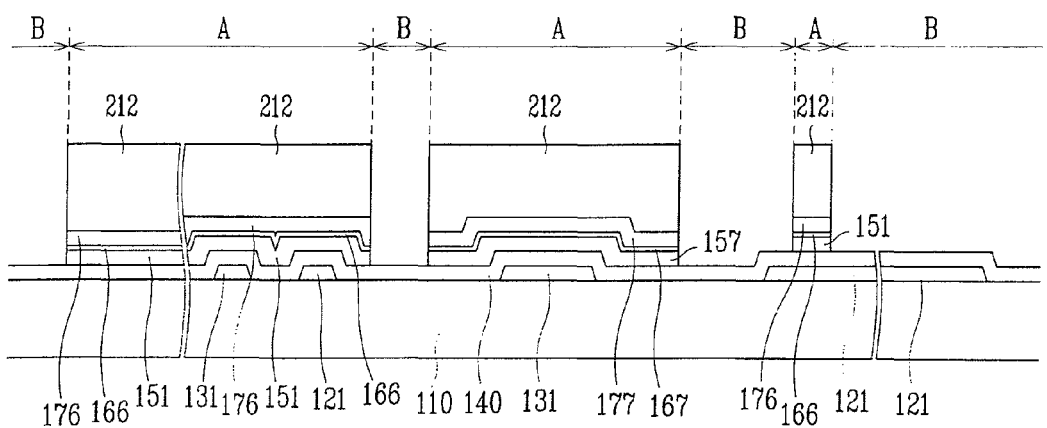
Figure 19H:
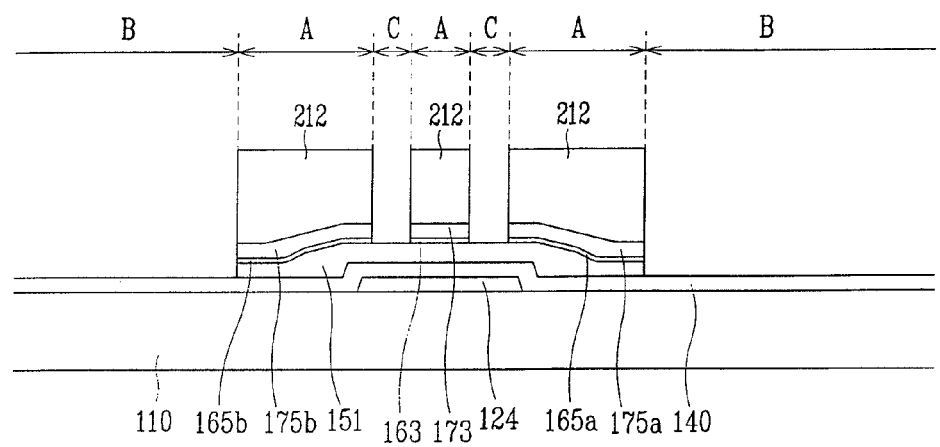
Figure 19I:
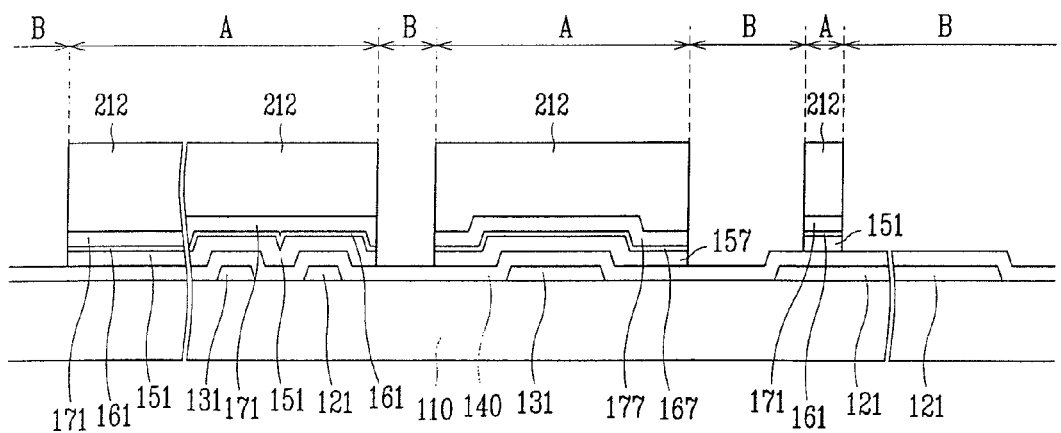

An exemplary sequence is shown in FIGS. 19D to 19I:

(1) Removal of portions of the metal layer 170, the doped a-Si layer 160 and the semiconductor layer 150 under the third portion of the photoresist film (FIGS. 19D to 19G);

(2) Removal of the second portion 214 of the photoresist film (FIGS. 19F and 19G;

(3) Removal of portions of the metal layer 170 and the doped a-Si layer 160 under the second portion 214 of the photoresist film (FIGS. 19H and 19I); and (4) Removal of the first portion 212 of the photoresist film.

Another exemplary sequence is as follows:

(1) Removal of portions of the metal layer 170 under the third portion of the photoresist film;

(2) Removal of the second portion 214 of the photoresist film;

(3) Removal of portions of the doped a-Si layer 160 and the semiconductor layer 150 under the third portion of the photoresist film;

(4) Removal of portions of the metal layer 170 under the second portion 214 of the photoresist film;

(5) Removal of the first portion 212 of the photoresist film; and (6) Removal of the doped a-Si layer 160 under the second portion 214 of the photoresist film.

Although the removal of the second portion 214 of the photoresist film causes the thickness reduction of the first portion 212 of the photoresist film, it does not remove the first portion 212, which protects the underlying layers from removal or etching, since the thickness of the second portion 214 is smaller than the first portion 212.

By selecting an appropriate etching condition, the second portion 214 of the photoresist film and the portions of the doped a-Si layer 160 and the semiconductor layer 150 under the third portion of the photoresist film are simultaneously removed. Similarly, the removal of the first portion 212 of the photoresist film and the removal of the portions of the doped a-Si layer 160 under the second portion 214 of the photoresist film are simultaneously performed. For instance, the etched thicknesses of the photoresist film and the semiconductor layer 150 (or the doped a-Si layer 160) are nearly the same when using a gas mixture of $SF_6$ and HCl, or a gas mixture of $SF_6$ and $O_2$.

Photoresist remnants left on the surface of the metal layer 170, if any, are removed by ashing.

Examples of etching gases used for etching the doped a-Si layer 160 in the step (3) of the first example and in the step (4) of the second example are a gas mixture of $CF_4$ and HCl and a gas mixture of $CF_4$ and $O_2$. Use of the gas mixture of $CF_4$ and $O_2$ enables to obtain uniform thickness of etched portions of the semiconductor layer 150.

Figure 20A:
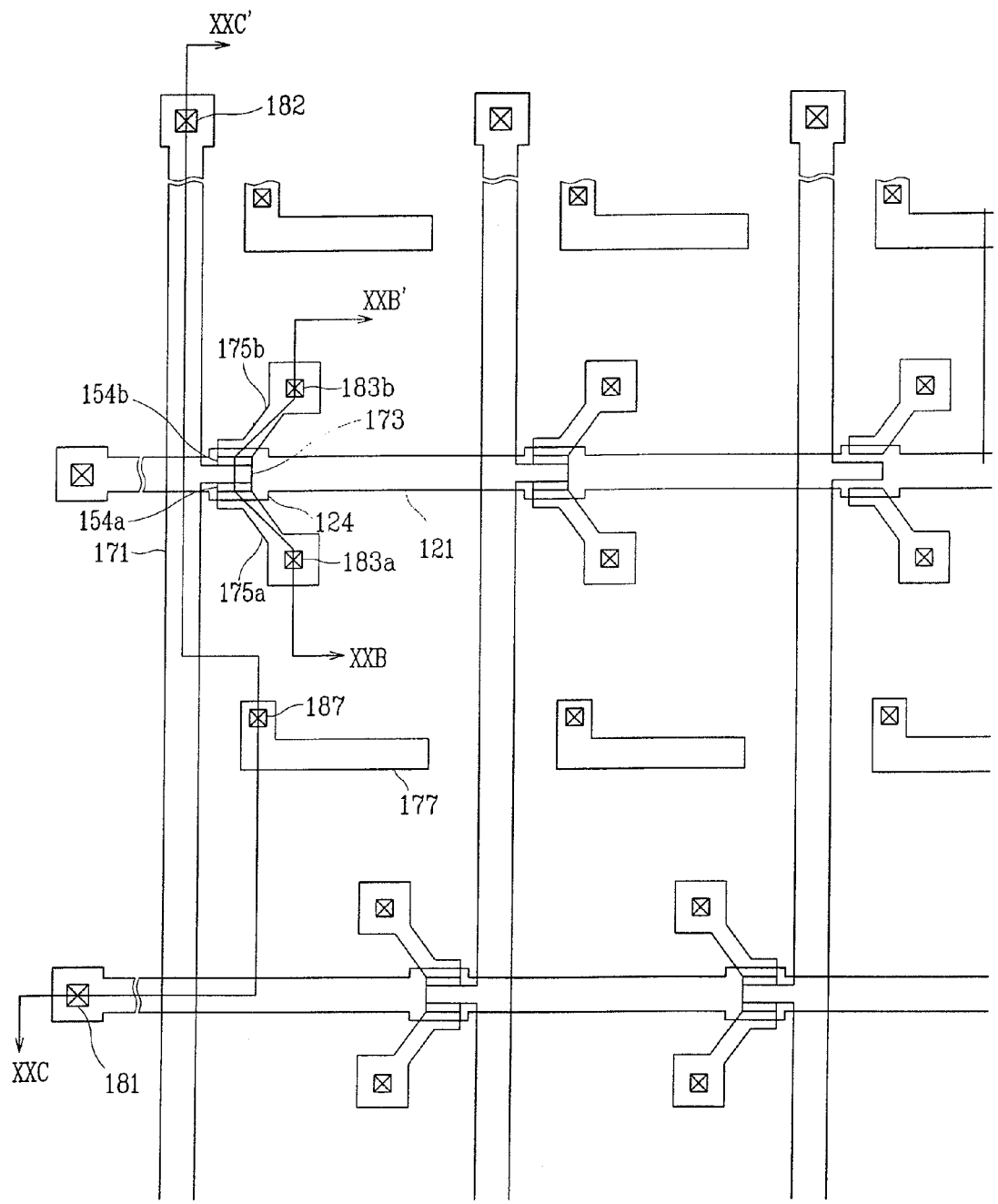
Figure 20B:
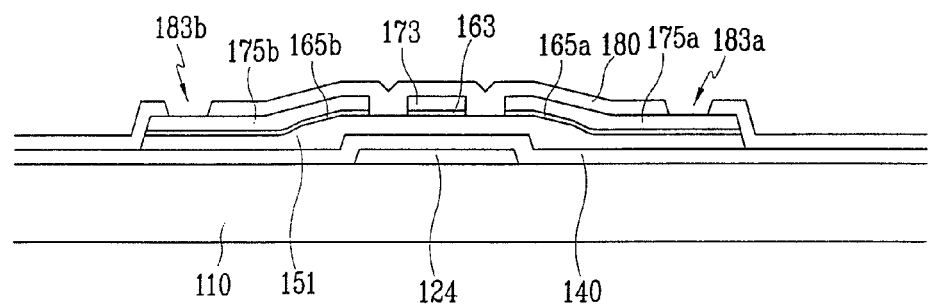
Figure 20C:
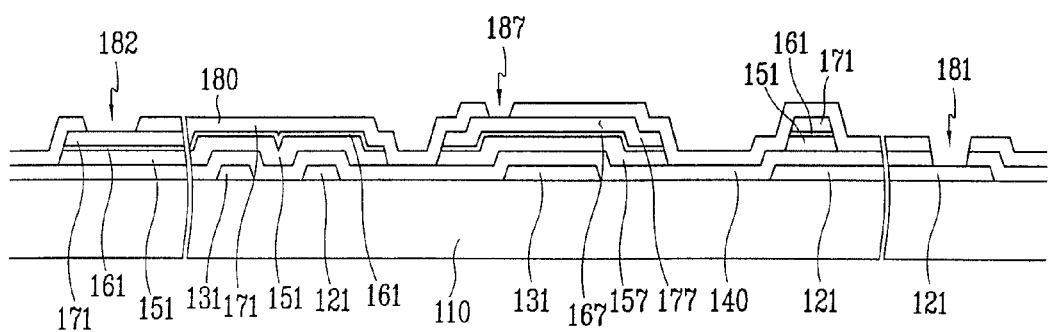

As shown in FIGS. 20A to 20C, a passivation layer 180 is formed, and the passivation layer 180 together with the gate insulating layer 140 is photo-etched to form a plurality of contact holes 181, 182, 183a, 183b and 187 exposing end portions of the gate lines 121, end portions of the data lines 171, the drain electrodes 175a and 175b, and the coupling electrodes 177, respectively.

Finally, an ITO layer or an IZO layer with thickness of about 500-1,000.ANG. is deposited and photo-etched to form a plurality of pairs of pixel electrodes 190a and 190b connected to the drain electrodes 175a and 175b and the coupling electrodes 177 through the contact holes 183a, 183b and 187, respectively, and a plurality of contact assistants 91 and 92 connected to the exposed end portions of the gate lines 121 and of the data lines 171 through the contact holes 181 and 182, respectively.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
   a first transistor electrically connected to a first gate line and a first data line:
   a second transistor electrically connected to a second gate line and a second data line formed adjacent to the first data line;
   a first pixel electrode electrically connected to the first transistor and receiving a first data signal from the first data line according to a gate-on signal of the first gate line:
   a second pixel electrode electrically connected to the second transistor and receiving a second data signal from the second data line according to a gate-on signal of the second gate line; and
   a coupling electrode coupling a portion of the first pixel electrode to a portion of the second pixel electrode,
   wherein the coupling electrode overlaps the portion of the first pixel electrode and is connected to the portion of the second pixel electrode, and
   wherein both of the pixel electrodes comprise two sub-pixels respectively.

2. The liquid crystal display of claim 1, wherein both of the pixel electrodes are disposed in a pixel column, and the first transistor is located on a left hand side of the pixel column and the second transistor is located on a right hand side of the pixel column.

3. The liquid crystal display of claim 2, wherein each of the first and second transistors comprises two switching elements which are connected to the two sub-pixels of the first and second pixel electrodes respectively, and
   wherein the coupling electrode is formed between a second sub-pixel of the first pixel electrode and a first sub-pixel of the second pixel electrode.

4. The liquid crystal display of claim 3, wherein the coupling electrode overlaps the second sub-pixel of the first pixel electrode and is electrically connected to the first sub-pixel of the second pixel electrode.

5. The liquid crystal display of claim 4, wherein when a voltage of the coupling electrode is changed, an initial charged voltage of the first sub-pixel of the second pixel electrode and an initial charged voltage of the second sub-pixel of the first pixel electrode are shifted to a different level.

6. The liquid crystal display of claim 1, wherein the first and the second data lines provide data signals having a polarity reversed every at least one row such that the first and second pixel electrodes in the pixel column receive the data voltages having the same polarity.

7. The liquid crystal display of claim 1, wherein a voltage of the coupling electrode is changed so that an initial charged voltage of one of the sub-pixels of the first pixel electrode is shifted.

8. A liquid crystal display comprising:
- a liquid crystal panel assembly including a plurality of pixels, a plurality of gate lines and a plurality of data lines,
- wherein the number of the data lines is larger than the number of pixel columns, the data lines are separated from each other in the panel assembly, and each pixel comprises two sub-pixels,
- wherein sub-pixels of a first pixel in a pixel column are commonly connected to a data line that is located on a left hand side of the pixel column and sub-pixels of a second pixel in the pixel column are commonly connected to a data line that is located on a right hand side of the pixel column.

9. The liquid crystal display of claim 8, further comprising a capacitor electrode which overlaps a second sub-pixel of the first pixel and a first sub-pixel of the second pixel,
- wherein a voltage of the capacitor electrode is changed so that an initial charged voltage of the second sub-pixel of the first pixel is shifted.

10. The liquid crystal display of claim 8, wherein at least two of the data lines are supplied with the same data signal.

11. The liquid crystal display of claim 10, wherein the two data lines are electrically connected to each other.

12. The liquid crystal display of claim 8, wherein the data lines disposed on both sides of the pixel column provide data signals having opposite polarities each other.

13. The liquid crystal display of claim 8, wherein the pixels in the pixel column are charged with electric signals having the same polarities with respect to a common electric signal during a frame time.

* * * * *